US012707407B2

(12) United States Patent
Abir et al.

(10) Patent No.: US 12,707,407 B2
(45) Date of Patent: Aug. 11, 2026

(54) CONTENT BASED SYNCHRONIZATION OF SIMILAR DATA PACKETS RECEIVED BY UNSYNCHRONIZED WIRELESS RECEIVERS

(71) Applicant: A.D Knight Ltd., Herzliya (IL)

(72) Inventors: Jonathan Haim Abir, Rehovot (IL); Sharon Peleg, Tel-Aviv (IL)

(73) Assignee: A.D Knight Ltd., Herzliya (IL)

( * ) Notice: Subject to any disclaimer, the term of this patent is extended or adjusted under 35 U.S.C. 154(b) by 347 days.

(21) Appl. No.: 18/559,860

(22) PCT Filed: May 11, 2022

(86) PCT No.: PCT/IL2022/050489

§ 371 (c)(1),
(2) Date: Nov. 9, 2023

(87) PCT Pub. No.: WO2022/239003

PCT Pub. Date: Nov. 17, 2022

(65) Prior Publication Data

US 2024/0244546 A1 Jul. 18, 2024

Related U.S. Application Data

(60) Provisional application No. 63/187,437, filed on May 12, 2021.

(51) Int. Cl.
*H04W 56/00* (2009.01)
*G01S 5/02* (2010.01)
(Continued)

(52) U.S. Cl.
CPC ....... *H04W 56/001* (2013.01); *G01S 5/02216* (2020.05); *H04B 17/21* (2015.01); *H04B 17/27* (2015.01)

(58) Field of Classification Search
CPC .. H04W 56/001; G01S 5/02216; H04B 17/21; H04B 17/27
See application file for complete search history.

(56) References Cited

U.S. PATENT DOCUMENTS

| | | | | |
|---|---|---|---|---|
| 2008/0259966 | A1* | 10/2008 | Baird | H04N 21/6332 370/503 |
| 2010/0118858 | A1* | 5/2010 | Pisharody | G01S 5/021 370/349 |

(Continued)

FOREIGN PATENT DOCUMENTS

| | | |
|---|---|---|
| WO | WO 2007/089778 | 8/2007 |
| WO | WO 2015/077767 | 5/2015 |
| WO | WO 2022/239003 | 11/2022 |

OTHER PUBLICATIONS

International Preliminary Report on Patentability Dated Nov. 23, 2023 From the International Bureau of WIPO Re. Application No. PCT/ IL2022/050489 (8 Pages).

(Continued)

*Primary Examiner* — Christopher M Brandt

(57) ABSTRACT

Disclosed herein are methods and systems for synchronizing data packets received by distinct unsynchronized receivers from a wireless transmitter. Each of a plurality of distinct unsynchronized receivers having no common time base may receive data packets transmitted by a wireless transmitter and in addition to computing reception data may compute a respective identifier (ID) for each of the packets based on the content of the respective packet which may temporally unique for at least a certain period of time compared to other data packets. A synchronization unit may receive the IDs associated with their reception data and may correlate between similar data packets based on their IDs. The synchronization unit may further output the correlated IDs coupled with their respective reception data to one or more (Continued)

apparatuses configured to process jointly the reception data associated with at least some of the correlated IDs.

23 Claims, 8 Drawing Sheets

(51) Int. Cl.
*H04B 17/21* (2015.01)
*H04B 17/27* (2015.01)

(56) References Cited

U.S. PATENT DOCUMENTS

| | | | | |
|---|---|---|---|---|
| 2011/0140970 | A1 | 6/2011 | Fukagawa | |
| 2017/0070578 | A1* | 3/2017 | Osei-Bonsu | H04W 4/38 |
| 2018/0024224 | A1* | 1/2018 | Seller | G01S 5/06<br>342/461 |
| 2023/0094455 | A1* | 3/2023 | Li | H04L 1/1854<br>370/329 |

OTHER PUBLICATIONS

International Search Report and the Written Opinion Dated Aug. 11, 2022 From the International Searching Authority Re. Application No. PCT/IL2022/050489. (15 Pages).
Communication Pursuant to Article 94(3) EPC Dated Sep. 17, 2025 From the European Patent Office Re. Application No. 22724928.1 (5 Pages).

* cited by examiner

| Bits 0–13 | Bit 14 | Bit 15 | Usage |
|---|---|---|---|
| 0–32 767 | | 0 | Duration value (in microseconds) within all frames other than PS-Poll frames transmitted during the CP, and under HCF for frames transmitted during the CFP |
| 0 | 0 | 1 | Fixed value under point coordination function (PCF) within frames transmitted during the CFP |
| 1–16 383 | 0 | 1 | Reserved |
| 0 | 1 | 1 | Reserved |
| 1–2007 | 1 | 1 | AID in PS-Poll frames |
| 2008–16 383 | 1 | 1 | Reserved |

FIG. 3B

CONTENT BASED SYNCHRONIZATION OF SIMILAR DATA PACKETS RECEIVED BY UNSYNCHRONIZED WIRELESS RECEIVERS

RELATED APPLICATIONS

This application is a National Phase of PCT Patent Application No. PCT/IL2022/050489 having International filing date of May 11, 2022 which claims the benefit of priority under 35 USC § 119 (e) of U.S. Provisional Patent Application No. 63/187,437 filed on May 12, 2021. The contents of the above applications are all incorporated by reference as if fully set forth herein in their entirety.

FIELD AND BACKGROUND OF THE INVENTION

The present invention, in some embodiments thereof, relates to synchronizing data packets transmitted by wireless transmitters, and, more specifically, but not exclusively, to synchronizing similar data packets transmitted by wireless transmitters which are received by a plurality of unsynchronized receivers based on content of the data packets.

With mobile based technology rapidly advancing in giant leaps, deployment of mobile devices is constantly growing for an endless variety of applications, services, systems, platforms and/or infrastructures ranging from commercial oriented services, through agricultural and ecological systems to military applications.

One such function of the mobile based services and systems relates to localization, specifically to locating, i.e., determining the location of the wireless devices. Various technologies and algorithms have been developed to address this necessity and provided reliable location, positioning and/or tracking solutions for mobile devices.

These solutions may include satellite-based services, for example Global Positioning System (GPS) sensors which may be coupled to the mobile devices. Other technologies, for example, triangulation may be based on deploying static receivers configured to receive wireless signals transmitted by the mobile devices and computing the location of the wireless devices by aggregating reception data computed for the received wireless signals.

Each of the localization technologies may naturally have its advantages and limitations with respect to accuracy, reliability, robustness, cost, durability to name just a few.

SUMMARY OF THE INVENTION

According to a first aspect of the present invention there is provided a method of synchronizing data packets received by distinct unsynchronized receivers from a wireless transmitter, comprising using one or more processors for:

Receiving asynchronously a plurality of identifiers (ID) each of a respective one of a plurality of data packets transmitted by one or more wireless transmitters via one or more wireless transmission channels and received by a plurality of distinct unsynchronized receivers. Each of the plurality of IDs is associated with respective reception data computed by one of the plurality of receivers.

Correlating, based on the IDs, between similar data packets received by at least some of the plurality of receivers.

Outputting the correlated IDs coupled with their associated reception data to one or more apparatuses configured to process jointly the reception data associated with at least some of the correlated IDs.

According to a second aspect of the present invention there is provided a system for synchronizing data packets received by distinct unsynchronized receivers from a wireless transmitter, comprising one or more processors configured to execute a code, the code comprising:

Code instructions to receive asynchronously a plurality of identifiers (ID) each of a respective one of a plurality of data packets transmitted by one or more wireless transmitters via one or more wireless transmission channels and received by a plurality of distinct unsynchronized receivers. Each of the plurality of IDs is associated with respective reception data computed by one of the plurality of receivers;

Code instructions to correlate, based on the IDs, between similar data packets received by at least some of the plurality of receivers.

Code instructions to output the correlated IDs coupled with their associated reception data to one or more apparatuses configured to process jointly the reception data associated with at least some of the correlated ID.

In a further implementation form of the first and/or second aspects, the similar correlated data packets correspond to one or more data packets transmitted by the one or more wireless transmitters which are received by the at least some receivers.

In a further implementation form of the first and/or second aspects, the reception data associated with each received data packet comprising at least a Received Signal Strength Indicator (RSSI) of the respective received data packet.

In a further implementation form of the first and/or second aspects, each of the receivers is further configured to associate each received data packet with a respective time of arrival (TOA) of the respective data packet.

In a further implementation form of the first and/or second aspects, the ID of at least some of the plurality of data packets is temporally-unique with respect to preceding and/or succeeding data packets transmitted by the one or more wireless transmitters at least during a predefined time period.

In a further implementation form of the first and/or second aspects, the ID of each of the plurality of data packets is computed based on at least part of the respective data packet.

In a further implementation form of the first and/or second aspects, the at least part of the respective data packet comprises one or more fields of the respective data packet defined by one or more communication protocols used to transmit the respective data packet via the one or more wireless transmission channels.

In a further implementation form of the first and/or second aspects, the ID of the data packets is further computed based on one or more network parameters of the one or more wireless transmission channels.

In a further implementation form of the first and/or second aspects, the ID of the data packets is further computed based on a device ID of the one or more wireless transmitters extracted from one or more of the plurality of data packets to associate between the one or more data packets and the one or more wireless transmitters.

In a further implementation form of the first and/or second aspects, the ID of at least some of the plurality of data packets is computed using one or more arbitrary-length content mapping functions applied to at least part of the respective data packet, the one or more arbitrary-length content mapping functions is a member of a group consisting of: a hash function, a cryptographic hash function and a CRC function.

In an optional implementation form of the first and/or second aspects, a common time base is established among the plurality of receivers based on a reception time of the at least some correlated data packets.

In a further implementation form of the first and/or second aspects, at least some of the plurality of data packets are correlated based on the common time base.

In a further implementation form of the first and/or second aspects, at least some of the plurality of receivers are synchronized based on the common time base.

In an optional implementation form of the first and/or second aspects, a common sampling time base is established for at least some of the plurality of receivers based on the common time base, the common sampling time base defines a sampling time for each of a plurality of wireless transmission channels used by the one or more wireless transmitters to transmit the plurality of data packets.

In a further implementation form of the first and/or second aspects, the one or more apparatuses comprise an integration unit of a compound receiver comprising the plurality of receivers, the integration unit is configured to aggregate the reception data associated with the correlated IDs to produce transformed reception data.

In a further implementation form of the first and/or second aspects, the one or more apparatuses comprises a locator system configured to compute a location of the one or more wireless transmitters with respect to the at least some receivers based on the reception data associated with the correlated IDs.

In a further implementation form of the first and/or second aspects, the location computed for the one or more wireless transmitters is a relative location with respect to the at least some receivers.

In a further implementation form of the first and/or second aspects, the location computed for the one or more wireless transmitters is an absolute location computed based on predefined locations of the at least some receivers.

In an optional implementation form of the first and/or second aspects, one or more of the plurality of receivers are calibrated according to a known location of the wireless transmitter.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings:

Referring now to the drawings.

FIG. 3A and FIG. 3B are schematic illustrations of exemplary data packet structures used to compute an identifier (ID) for each received data packet for correlating similar data packets, according to some embodiments of the present invention;

DESCRIPTION OF SPECIFIC EMBODIMENTS OF THE INVENTION

Figure 1:
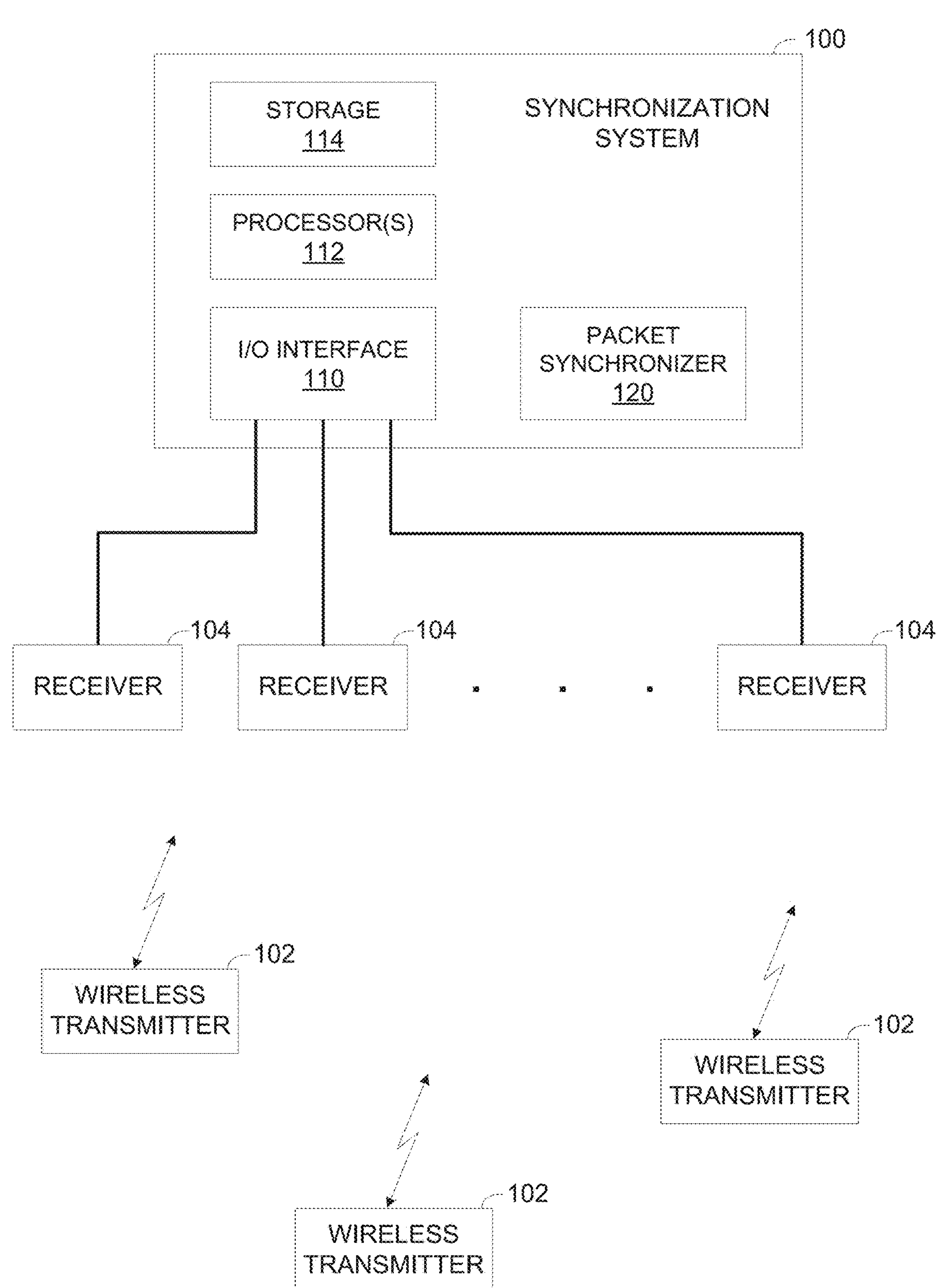
FIG. 1 is a schematic illustration of an exemplary system for synchronizing data packets transmitted by wireless transmitters and received by multiple unsynchronized receivers based on content of the data packets, according to some embodiments of the present invention.

The present invention, in some embodiments thereof, relates to synchronizing data packets transmitted by wireless transmitters, and, more specifically, but not exclusively, to synchronizing similar data packets transmitted by wireless transmitters which are received by a plurality of unsynchronized receivers based on content of the data packets.

Locating wireless transmitting devices may be done by deploying multiple distinct receivers at different locations to receive wireless signals transmitted by the wireless transmitters and computing the location of the wireless transmitters based on the received wireless signals.

The wireless transmitters may transmit the wireless signals via one or more wireless transmission channels employing one or more wireless transmission technologies, for example, cellular transmission, wireless Local Area Network (LAN) transmission (e.g., Wi-Fi), Bluetooth transmission, Radio Frequency (RF) transmission and/or the like utilizing one or more frequency bands as known in the art.

Each receiver may be configured to compute reception data for each wireless signal, specifically each data packet carried (modulated, encoded, etc.) by the wireless signals transmitted by one of the wireless transmitters which the respective receiver intercepts. The reception data, for example, Received Signal Strength Indicator (RSSI) indicative of the strength of the signal received at the receiver, Angle of Arrival (AOA), Time of Arrival (TOA) and/or the like may be computed, derived and/or determined using one or more methods, architectures and/or implementations as known in the art.

Computing the location of the wireless transmitters based on their received wireless signals may be done using one or more radio-location methods, techniques and/or algorithms as known in the art, for example, triangulation and/or the like which may be based on the reception data computed for the received wireless signals.

Since the location of the wireless transmitter is computed based on differences in the reception (e.g. RSSI, AOA, etc.) of the wireless signals at the plurality distinct receivers, the reception differences between the receivers should relate to similar wireless signals, i.e. signals corresponding to the same wireless signal transmitted by the wireless transmitter.

Correlating between similar wireless signals is of particular importance and is in fact mandatory for determining the location of mobile wireless transmitters which are in motion since their location is dynamic such that each set of similar wireless signals corresponds to a specific wireless signal transmitted by the wireless transmitter at a specific point in time while located at a specific location. If not properly correlated, the signals received by different receivers may correspond to different wireless signals transmitted by the wireless transmitter at different times while being at different locations.

According to some embodiments of the present invention, there are provided methods, systems and computer program products for synchronizing and correlating similar wireless signals which are transmitted by the wireless transmitters and received by a plurality of unsynchronized receivers sharing no synchronized clock.

Specifically, similar data packets carried (modulated, encoded, encapsulated) by the wireless signals which correspond to same data packet(s) transmitted by the wireless transmitter may be correlated (synchronized) based on the content of the data packets.

As stated, the wireless signals transmitted by the wireless transmitter carry (modulate, encode, etc.) data packets which may be received by multiple receivers and correlated together based on their content. However, for brevity the terms wireless signal and data packet may be used interchangeably throughout this disclosure. For example, references to the content of the wireless signals may practically relate to the content of the data packets carried by the wireless signals. In another example, the reception time of a data packet may in practice relate to the reception time of the wireless signal carrying the data packet.

Typically, the content of most of the data packets transmitted by the wireless transmitter are temporally-unique compared to the content of preceding and/or succeeding data packets at least for a time period, for example, 10, 15, 20 packets and/or the like.

Each of the unsynchronized receivers which may include one or more antennas configured to receive wireless transmission signals transmitted in one or more frequency bands may be further configured to at least partially decipher the data carried by the received wireless signals. For example, each receiver may identify at least raw data bits of the data packets encoded in the received wireless signals. However, the receivers may be further configured to partition the data packets' raw bits to bytes and meaningful fields according to one or more known networking and/or communication protocols, specifically according to the communication protocol(s) employed by the wireless transmitters. Such data packet partitioning may usually include identifying at least a header and a payload of the data packet including data fields of the data packets, for example, a source, a destination, a packet size, a packet type, information descriptive of the payload and/or the like.

Each of the receivers which receives data packets carried by wireless signals transmitted by the wireless transmitter may therefore compute reception data for each received data packet, for example, RSSI, AOA, and/or the like and may further associate the respective received data packet with its respective reception data. The receivers may further associate each of the received data packets with a respective reception time, for example, Time of Arrival (TOA) indicative of a reception time of the respective data packet by the respective receiver.

Each of the receivers may further compute an identifier (ID) for each received data packet based on the content of the respective data packet and/or part thereof, for example, payload data, one or more headers, fields and/or the like defined by one or more networking and/or communication protocols used to transmit the respective data packet and/or the like. For example, in case only raw bits are supported, the ID of each received data packet may be computed based on the raw bits of the respective received data packet and/or part thereof. In another example, assuming the receivers are capable to decipher networking and/or communication protocol(s) encoding, the ID of each received data packet may be computed based on the values of one or more of the data fields of the respective received data packet.

Moreover, the receivers may compute and/or produce the ID for one or more of the received data packets by applying one or more arbitrary-length content mapping functions, for example, a cryptographic hash function, a hash function, a Cyclic Redundancy Check (CRC) function and/or the like to at least part of the content of the respective data packets.

Optionally, the ID may be computed based also on one or more network parameters indicative of the wireless transmission channel used by the originating wireless transmitter to transmit the data packets.

Optionally, the ID may be computed based also on a device ID identified in the received data packets which is indicative of the originating wireless transmitter.

Each of the receivers may then transmit the ID computed for each received data packet coupled with the reception data computed for the respective data packet to one or more or more synchronization units, for example, an integration unit.

Since most of the data packets transmitted by the wireless transmitter are typically temporally-unique for at least a certain time period, the ID of these data packet may be also temporally-unique for at least the certain time period.

Similar data packets which are data packets received by multiple different receivers but correspond to the same data packet transmitted by the wireless transmitter may be therefore correlated and synchronized by the synchronization unit based on their IDs, i.e., data packets having the same ID may be considered similar data packets and may be thus correlated together.

Optionally, the synchronization unit may establish a common time base between at least some of the plurality of receivers based on the correlated data packets. The synchronization unit receiving the IDs from the receivers may determine the reception time of each data packet received at each receiver to identify time difference between receivers. The synchronization unit may thus map each received data packet with respect to the common time base according to the time difference identified for the respective receiver which received the respective data packet. The common time base may be therefore established based on the timing of the reception events at the plurality of receivers.

Moreover, the synchronization unit may correlate one or more similar data packets according to the common time base. For example, data packets which are received by different receivers may be thus received by the synchronization unit at different times. However, in case such data packets are mapped to the same time with respect to the common time base, these data packets may be considered similar since they may correspond to the same data packet transmitted by the wireless transmitter at a certain time and may be therefore correlated together.

Furthermore, the synchronization unit may establish a common sampling time base for at least some of the receivers based on the common time base. The common sampling time base may define a sampling time and optionally an order of sampling a plurality of wireless transmission channels used by the wireless transmitters to transmit data packets.

The synchronization unit may then output the correlated IDs coupled with their associated reception data to one or more apparatuses, systems, services and/or the like configured to process jointly the reception data associated with at least some of the correlated IDs for one or more applications.

A first important such application is computing and/or determining the location of the wireless transmitter based on the reception data of correlated IDs computed for the similar data packets by the plurality of distinct and unsynchronized receivers which receive the correlated similar data packets.

According to some embodiments of the present invention, at least some of the receivers used to determine the location of the wireless transmitter may be calibrated according to a known location of one or more wireless transmitters. The known location of the wireless transmitter may be determined, provided and/or otherwise obtained using one or more other tracking, positioning and/or locating systems, services, platforms and/or infrastructures, for example, a Global Positioning System (GPS), a map-based service and/or the like. In particular, the calibration of the receivers may be done by comparing reception or transformed reception data with an expected reception data as should be received from the known location of the wireless transmitter(s) or compute its location and compare it with its known location.

Another application which may benefit from processing jointly the reception data associated with at least some of the correlated IDs is directed to compute transformed reception data based on the reception data associated with the correlated IDs. For example, one or more compound receivers may be constructed of a plurality of unsynchronized receivers sharing no common clock.

Each of the receivers which is connected to one or more antennas of the receiver and may be configured to receive data packets transmitted by one or more wireless transmitters and generate respective reception data. The receivers may further compute an ID for each received data packet based on the content of the data packet as described herein before and associate the ID of each packet with the reception data computed for the receptive data packet.

The compound receiver may further comprise an integration unit configured to correlate between similar data packets received by different unsynchronized receivers based on their IDs in order to compute transformed reception data, for example, a direction from which the received data packets are transmitted (AOA) and/or the like by aggregating the reception data associated with the correlated similar data packets.

The transformed reception data received from one or more compound receivers may be further correlated based on the ID computed for the similar data packets and may be used, for example, for computing the location of the wireless transmitter.

Correlating similar data packets received by unsynchronized receivers based on the content of the received data packets may present significant advantages and benefits compared to currently existing systems and methods for synchronizing similar wireless signals transmitted by wireless transmitters.

First, some of the existing systems if not most rely on synchronized receivers such that similar data packets received by different synchronized receivers may be correlated based on their reception timing. Such synchronization of the receivers may present major limitations. One such limitation is the need to use high-end receivers having advanced clock circuits and/or timing mechanisms which support external synchronization. Such high-end receivers may be more complex, more expensive, susceptible to higher failure rates and/or the like. Moreover, using receivers from different vendors which may support different clock synchronization provisions and/or protocols may be limited and/or significantly complicated and may increase cost of the deployment of the receives. Furthermore, major wiring and cabling infrastructures may be required for distributing the synchronized clock between the receivers which may be significantly distant from each other thus further increasing cost and/or complexity of the receivers' deployment.

On the other hand, correlating the similar data packets based on their content may be done using unsynchronized receivers thus completely eliminating the need for any synchronization provisions, infrastructures and/or the like which may be highly complex and/or costly and hence significantly reducing complexity and/or cost of the receivers' deployment. Moreover, since the receivers do not need to be synchronized, simple low-end receivers optionally from different vendors may be used thus further reducing cost of the receivers.

Moreover, even when the receivers are synchronized as required by the existing methods, at least some of the receivers may receive, at a specific time, data packets originating from different wireless transmitters which are naturally unrelated to each other for applications such as geo-locating the wireless transmitters, enhancing the reception data of data packets transmitted by the wireless transmitters and/or the like. By correlating the data packets based on their content, on the other hand, there is no such concern of mixing data packets originating from different wireless transmitters since the correlation is not time based but rather content based and the content of packets transmitted by different wireless transmitters may be inherently different.

Furthermore, correlating the data packets based on their IDs which are computed also based on the network parameter(s) of the wireless transmission channel used by the wireless transmitter may reduce and potentially eliminate the probability of mixing data packets received from different wireless transmission channels thus increasing accuracy, reliability and/or robustness of the similar data packets correlation. Moreover, correlating the data packets based on their IDs which are computed also based on the device ID of the wireless transmitter may reduce and potentially eliminate the probability of mixing data packets transmitted by different wireless transmitters thus further increasing accuracy, reliability and/or robustness of the similar data packets correlation.

In addition, computing the IDs using the arbitrary-length content mapping functions, for example, a cryptographic hash function, a hash function, CRC and/or other such functions may significantly reduce the IDs' size thus significantly reduce computing resources, for example, processing resources, processing time, storage resources, network resources and/or the like required to transmit the IDs, store the IDs, search for matching IDs indicative of similar data packets and/or the like.

Establishing, adjusting and updating the common time base whenever a successful correlation of similar data packets occurs and using the common time base for correlating other data packets which may not include temporally-unique data content may further increase accuracy, reliability and/or robustness of the correlation. In particular, this may allow to correlate similar data packets based on their reception timing as done by the existing methods while achieving that with no need for complex and/or costly synchronized receivers. Rather, the common clock base may be maintained and updated according to content-based correlation of temporally-unique data packets while the common clock base may be used for time-based correlation of data packets which are not temporally-unique with respect to preceding and/or succeeding data packets.

Establishing the common sampling time base may significantly increase efficiency, reliability and/or robustness of the content-based correlation of similar data packets. This may be of particular advantage when the receivers may be configured to monitor a plurality of wireless transmission channels used for transmitting data packets, in such scenarios, different receivers may sample different wireless transmission channels at different times which may lead to inability to correlate similar data packets with each other. By instructing each receiver of a specific sampling time and optionally a sampling order which is synchronized with the sampling time of the other receivers for sampling (receiving data packet(s)), the synchronization unit may ensure that multiple receivers and potentially all receivers are synchronized in their sampling time of the same wireless transmission channels.

Calibrating the receivers based on the known location of the wireless transmitter may serve to significantly reduce complex and/or costly calibration operations for calibrating the receivers as may be required by the existing methods. One or more simple wireless transmitters may be deployed to transmit data packets which may be received by the receivers and correlated together. Based on the correlation and the reception data computed by each receiver for the correlated data packets, the receivers may be easily and simply calibrated. Moreover, one or more existing services, systems and/or platforms may be used for the calibration, for example, one or more managed fleets of vehicles where each vehicle is equipped with a GPS sensor to record and report its location and is capable of transmitting wireless signals that may be received by the receivers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of an exemplary system for synchronizing data packets transmitted by wireless transmitters and received by multiple unsynchronized receivers based on content of the data packets, according to some embodiments of the present invention.

A synchronization system 100, for example, a server, a computing node, a cluster of computing nodes, a device, an apparatus and/or the like may be configured to synchronize data packets carried (modulated, encoded, encapsulated, etc.) by wireless signals transmitted by one or more wireless transmitters 102 based on which are received by at least some of a plurality of distinct and unsynchronized receivers 104, for example, received by at least two distinct receivers 104 located at different locations.

The wireless transmitters 102 having one or more wireless interfaces for transmitting wireless signals via one or more wireless transmission channels may transmit the wireless signals according to one or more wireless transmission technologies, for example, cellular transmission, wireless Local Area Network (LAN) transmission (e.g., Wi-Fi), Bluetooth transmission, Radio Frequency (RF) transmission and/or the like utilizing one or more frequency bands as known in the art. The data carried by the wireless signals transmitted by the wireless transmitter(s) 102, for example, data packets may be encoded and/or encapsulated according to one or more communication protocols as known in the art, for example, GSM, CDMA, LTE, WiMAX, IEEE 802.11 and/or the like.

While one or more of the wireless transmitters 102 may be static devices located in a fixed location, the wireless transmitters 102 may further include mobile wireless devices which are in motion and/or stationary at least temporarily. Such wireless transmitters 102 may include, for example, a mobile device used by one or more users, for example, a phone, a tablet, a wearable device (e.g. watch, goggles, tag, etc.). In another example, the wireless transmitters 102 may include one or more vehicular devices which may be integrated, mounted, attached and/or otherwise coupled to one or more manual and/or at least partially autonomous vehicles, for example, a car, a truck, a motorcycle, a bicycle, a train, a tram, a drone, an Unmanned Aerial Vehicle (UAV) and/or the like.

Each of the receivers 104 may include one or more antennas for intercepting wireless transmission signals transmitted in one or more frequency bands and may be therefore capable of receiving (intercepting) wireless transmission signals from a spectrum of frequencies. In particular, each receiver 104 may be configured to receive data packets carried by the wireless signals transmitted by one or more of the wireless transmitters 102.

The receivers 104 may be further configured to decipher the data included in the data packets, at least in raw bits form. Optionally, the receivers 104 may be capable of partitioning the data packets' raw bits to bytes and meaningful fields according to one or more of the networking and/or communication protocols employed by the wireless transmitters 102. Such data packet partitioning may usually include identifying at least a header and a payload of the data packet. The header typically includes data fields defined by the communication protocol to include information relating to the respective data packet, for example, a source (originating node), a destination (target node), a packet size, a packet type, information descriptive of the payload and/or the like. The payload may comprise data. The data in the payload of one or more of the data packets may be optionally encrypted and in some cases the payload of one or more of the data packets may be empty.

Each of the receivers 104 may be configured to compute reception data for each received wireless signal, specifically for each received data packet transmitted by one of the wireless transmitters 102. The reception data computed by the receivers 104 for each received data packet may include, for example, RSSI, Angle of Arrival (AOA), and/or the like.

Each of the receivers 104 may apply one or more methods, architectures and/or implementations as known in the art to compute, derive and/or determine the reception data. For example, one or more of the receivers 104 comprising a plurality of antennas, may compute the reception data for each data packet based on the reception parameters (e.g. time, angle, RSSI, etc.) of the respective packet at each of multiple antennas of the plurality of antennas correlated based on timing of the receiver 104 as known in the art, in another example, one or more of the receivers 104 may include a plurality of reception units and an integration unit (integrator). Each of the reception units may be connected to a respective one of a plurality of antennas of the receiver 104 and may be further configured to compute respective reception data for each received wireless signal, specifically for each received data packet carried by the received wireless signal. The integration unit of the receiver 104 may collect and aggregate the reception data computed by the plurality of reception units to compute transformed reception data for each received data packet, for example, a direction of the originating wireless transmitter 102 which transmitted the received wireless signal and/or the like.

Each of the receivers 104 may typically operate based on a local clock, for example, a timing mechanism, a clock circuit, a counter unit and/or the like which may be further used to compute the reception data and/or part thereof, for example, the TOA of one or more data packets received by the respective receiver 104.

However, while each receiver 104 may include a local clock, the plurality of distinct receivers 104 are unsynchronized with each other meaning that no common clock is shared between the receivers 104 to synchronize their local clocks. As such no means, for example, a mechanism, an infrastructure (e.g. beacon, wires, cables, etc.), a protocol and/or the like may be deployed to synchronize, share, distribute and/or otherwise establish a common clock between the receivers 104.

Optionally, the location of the receivers 104, for example, a geolocation is predefined and known to the synchronization system 100.

The synchronization system 100 may include an Input/Output (I/O) interface 110 for connecting and communicating with the receivers 104, a processor(s) 112 and a storage for storing data and code (program store).

The I/O interface 110 may include one or more wired and/or wireless network interfaces for communicating with the receivers 104, for example, a Local Area Network (LAN) interface, a Wide Area Network (WAN) interface, a Wireless LAN (WLAN) interface, a cellular interface, a Controller Area Network (CAN) bus interface and/or the like. The I/O interface 110 may further include one or more wired and/or wireless interconnection communication interfaces which may employ network topology, point to point topology and/or the like such as, for example, a serial port (e.g. RS-232, RS-422, RS-485, etc.), a Universal Serial Bus (USB) port, an RF communication channel, a proprietary interconnection and/or the like.

The synchronization system 100 may therefore communicate with the receivers 104 via the I/O interface 210. The communication links connecting the synchronization system 100 with the receivers 104 may employ one or more technologies, topologies and/or protocols. For example, the I/O interface 110 may connect to one or more networks, for example, a LAN network, a WLAN network and/or the like which may connect to all of the receivers 104. In another exemplary deployment, the receivers 104 may be divided into groups each connected to a respective one of a plurality of networks to which the I/O interface 110 is connected such that the synchronization system 100 may communicate with the receivers 104 via the plurality of networks. In another exemplary deployment, the synchronization system 100 may communicate with one or more of the receivers 104 via dedicated communication channels established via the I/O interface 110 between the synchronization system 100 and each receiver 104, for example, a serial communication channel, an RF communication channel and/or the like.

The processor(s) 112, homogenous or heterogeneous, may include one or more processing nodes arranged for parallel processing, as clusters and/or as one or more multi core processor(s). The storage 114 may include one or more non-transitory non-volatile, persistent memory devices and/or arrays, for example, a ROM, a Flash array, a hard drive, a Solid State Drive (SSD), a magnetic disk and/or the like for data and/or program store. The storage 114 may also include one or more volatile memory devices and/or arrays, for example, a RAM device, a cache memory and/or the like serving for temporary storage of data and/or program store. The storage 114 may optionally include one or more networked storage resources, for example, a storage server, a Network Attached Storage (NAS) and/or the like accessible via the I/O interface 110.

The processor(s) 112 may execute one or more software modules such as, for example, a process, a script, an application, an agent, a utility, a tool, an Operating System (OS), a driver, a plug-in, a patch, an update and/or the like each comprising a plurality of program instructions stored in a non-transitory medium (program store) such as the storage 114 and executed by one or more processors such as the processor(s) 112. The processor(s) 112 may further include, integrate, utilize and/or facilitate one or more hardware modules (elements) integrated and/or coupled to the synchronization system 100, for example, a circuit, a component, an Integrated Circuit (IC), an Application Specific Integrated Circuit (ASIC), a Field Programmable Gate Array (FPGA), a Digital Signals Processor (DSP), an Advanced Encryption Standard (AES) engine and/or the like.

The processor(s) 112 may therefore execute one or more functional modules, for example, a packet synchronizer 120 utilized by one or more software modules, one or more of the hardware modules and/or a combination thereof.

While the synchronization system 100 may be an independent entity separate of the receivers 104, for example, a server, a computing node, a cluster of computing nodes and/or the like connected to the plurality of receivers 104, the synchronization system 100 may optionally be integrated in one or more of the receivers 104 such that the respective receiver(s) 104 execute the packet synchronizer 120.

Optionally, the synchronization system 100, specifically, the packet synchronizer 120 may be implemented as one or more cloud-based computing services, platforms and/or infrastructures, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

Figure 2:
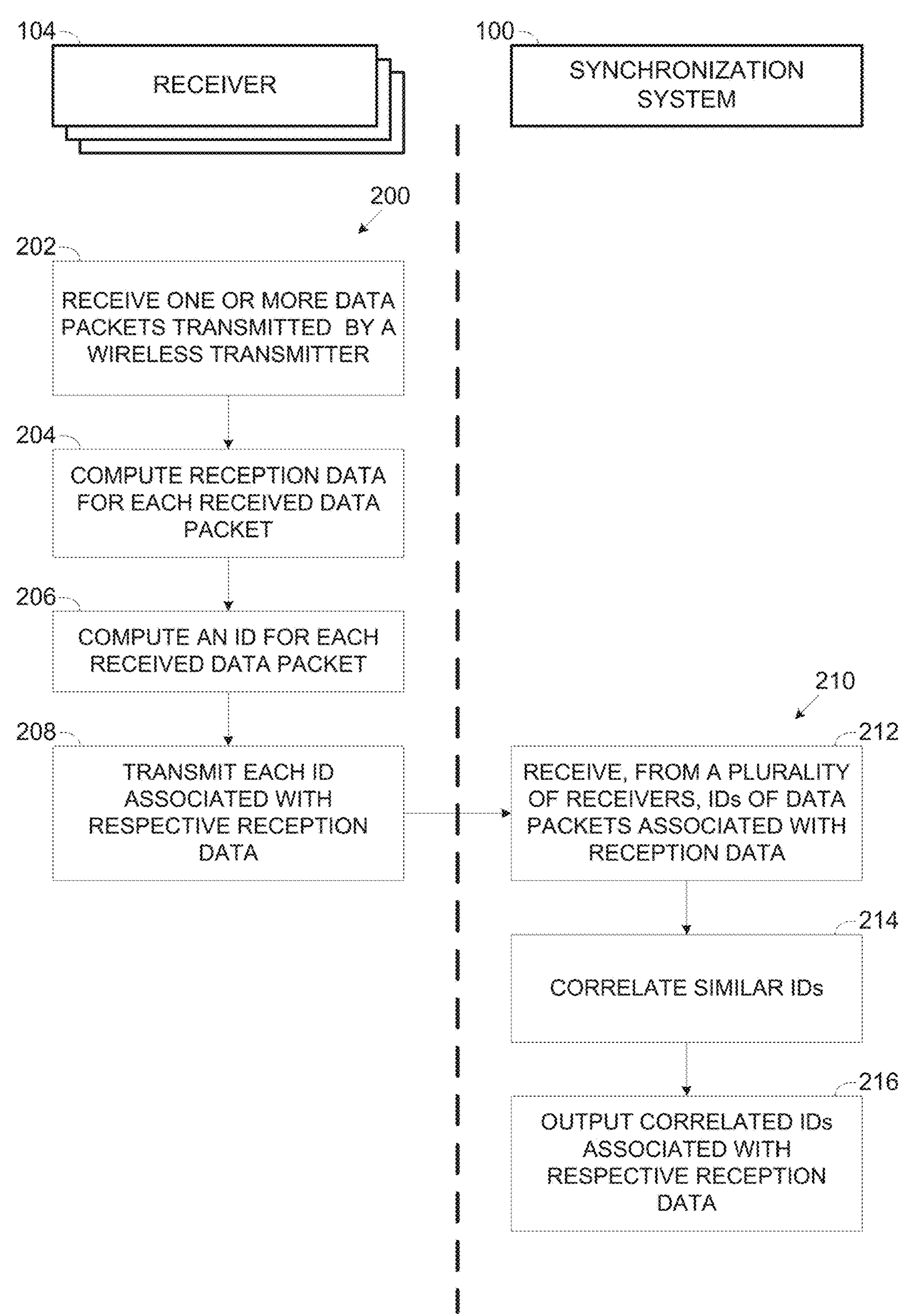
FIG. 2 presents flowcharts of exemplary processes executed for generating reception data for received data packets transmitted by a wireless transmitter and synchronizing similar data packets based on content of the data packets, according to some embodiments of the present invention.

FIG. 2 presents flowcharts of exemplary processes executed for generating reception data for received data packets transmitted by a wireless transmitter and synchronizing similar data packets based on content of the data packets, according to some embodiments of the present invention;

An exemplary process 200 may be executed by each of at least some of the receivers 104, in particular receivers 104 which receive data packets transmitted by one or more of the wireless transmitters 102 via one or more of the wireless transmission channels. Each such receiver 104 may execute a respective process (instance) 200 to compute reception data for each received data packet and transmit the received data packets associated (coupled) with their reception data to the synchronization unit 100.

An exemplary process 210 may be executed, for example, by the packet synchronizer 120 executed by the synchronization system 100 to receive data packets received by the receivers 104 and correlate similar data packets, i.e., data packets which are transmitted by a certain wireless transmitter 102 and received by multiple receivers 104. In particular, packet synchronizer 120 may synchronize the data packets by correlating between similar data packets based on the content of the data packets which may be unique for at least a predefined time period, for example, a duration of several thousand cycles which may be translated to several seconds (e.g. 3 seconds, 4 seconds, 5 seconds, etc.) and/or the like.

For brevity, the processes 200 and 210 are presented for synchronizing data packets transmitted by a single wireless transmitter 102 by correlating similar data packets transmitted by the wireless transmitter 102 and received by at least some of the receivers 104. This, however, should not be construed as limiting since the processes 200 and 210 may be expanded for synchronizing data packets transmitted by a plurality of wireless transmitters 102 by correlating similar data packets transmitted by the plurality of wireless transmitters 102 and received by the receivers 104.

As shown at 202, the process 200 which may be executed by a plurality of receivers 104 starts with the respective receiver 104 receiving one or more data packets transmitted by the wireless transmitter 102 via one or more of the wireless transmission channels.

Naturally, the process 200 may be launched and executed only by receivers 104 which are capable of receiving the wireless signals transmitted by the wireless transmitter 102, specifically operational receivers 104 which are in range of the transmission channel used by the wireless transmitter 102 to transmit the wireless signal carrying the data packets.

The reception of each data packet transmitted by the wireless transmitter 102 may be regarded as a reception event. Since typically the wireless transmitter 102 may transmit a plurality of data packets, the receiver 104 may create a sequence of reception events each relating or corresponding to a respective one of the received data packets transmitted by the wireless transmitter 102.

In case one or more of the receivers 104 receive data packets originating from multiple wireless transmitters 102, the sequence of reception events generated by the respective receiver 104 may comprise reception events corresponding to data packets originating from the multitude of originating wireless transmitters 102.

Each receiver 104 may further assign a time of reception (time stamp) to each reception event indicating a time of reception of the respective data packet. The receiver 104 may compute, derive and/or generate the reception time of each received data packet based on its local clock.

As shown at 204, each receiver 104 may compute reception data for each received data packet originating from the wireless transmitter 102, i.e. for each reception event.

The reception data computed by the receiver 104 may comprise at least the RSSI of each received data packet, in particular the RSSI indicative of the signal strength at the receiver of the received wireless transmission signal which carries the respective received data packet.

However, the reception data computed by one or more of the receivers 104 for one or more of the received data packets may further include one or more additional reception parameters relating to the respective received data packet. For example, the additional reception parameters computed for one or more of the received data packets (reception events) may include the AOA of the respective data packet received by the antenna array(s) of the respective receiver 104, in particular the AOA of the received wireless transmission signal(s) carrying the respective data packet. In another example, the additional reception parameters computed by one or more of the receivers 104 for one or more of the received data packets may include a time stamp, for example, the TOA of the respective received data packet. The receiver 104 may compute the TOA as known in the art, for example, according to the signal rise of the first bit of the respective data packet. In another example, the additional reception parameters computed by one or more of the receivers 104 for one or more of the received data packets may include a type and/or technology of the transmission channel employed to transmit the respective received data packet, for example, cellular, Wi-Fi, Bluetooth and/or the like.

A shown at 206, each receiver 104 may further compute an identifier (ID) for each received data packet based on the content of the respective data packet or at least on part of the content of the respective data packet.

The receivers 104 may apply one or more techniques, methods and/or algorithms for computing the ID for each of the received data packets. However, while different techniques, methods and/or algorithms may be applied for computing the data packets IDs, all receivers 104 must conform to the same techniques, methods and/or algorithms to compute the IDs in order to ensure consistency and ability for later correlating between similar IDs.

For example, assuming one or more of the receivers 104 are unaware of the communication protocol(s) used to encapsulate one or more of the data packets. In such case, since at least some of the receivers 104 may be unable to parse these data packets, all receivers 104 may therefore compute the ID for each of data packet based on the raw bits of the respective data packet and/or part thereof. For example, the receivers 104 may compute the ID for the data packets based on the entire bit stream identified in the respective data packet. In another example, the receivers 104 may compute the ID for the data packets based on one or more predefined segments of the raw bit stream (bit sequence) identified in the respective data packet, for example, a predefined number of initial bits counted from the start of the respective data packet.

In another example, in case the receivers 104 are configured to and capable to recognize one or more of the networking and/or communication protocols used to encode and/or encapsulate one or more of the data packets, the receivers 104 may compute the ID for each of the recognized data packets based on one or more data fields of the respective data packet defined by the respective communication protocol(s) used to transmit the respective data packet via the wireless transmission channel(s).

The plurality of data packets transmitted by a certain wireless transmitter 102 may typically differ from each other in their content. The difference in the content of the data packets may result from different data included in the data packets or different parameters in its header.

Since the content of each data packet transmitted by the transmitting device 102 may differ at least slightly (e.g. 1 bit) from its preceding and/or succeeding data packets, the ID of each data packet, computed based on in its content, may be temporally-unique with respect to the preceding and/or succeeding data packets at least during a predefined time period.

Optionally, the receivers 104 may compute the ID of one or more of the data packets based also on one or more network parameters of the wireless transmission channel, for example, the WLAN (e.g. Wi-Fi) from which the respective data packet is received. The network parameters which may include, for example, a network ID, a Unique Network Radio Characteristics (UNRC), a Service Set Identifier (SSID), a network type, a network channel, a network sub-channel and/or the like may uniquely identify each wireless transmission channel with respect to other wireless transmission channels. Since one or more of the receivers 104 may receive data packets transmitted via different concurrent wireless transmission channels, computing the ID based on the network parameters(s) may serve to further distinguish between data packets received from different wireless transmission channels. For example, two wireless networks (e.g. Wi-Fi) using the same transmission channel may have at least partially overlapping coverage areas such that one or more of the receivers 104 may occasionally receive one or more packets transmitted via the first wireless network and one or more packets transmitted via the second wireless network. In such case correlating the data packets based on the network parameter(s) may ensure that the correlated packets originate from the same transmitter 102 via the same wireless network.

Optionally, the receivers 104 may compute the ID of one or more of the data packets based also on a device ID of the wireless transmitter 102 which transmitted the respective data packet, for example, a Media Access Controller (MAC) address of the wireless transmitter 102, a S/N of the wireless transmitter 102 and/or the like. Since one or more of the receivers 104 may receive data packets transmitted from multiple different wireless transmitters 102, optionally via the same wireless transmission channel (network), computing the ID based on the device ID may serve to further distinguish between data packets originating from different wireless transmitters 102.

Figure 3A:
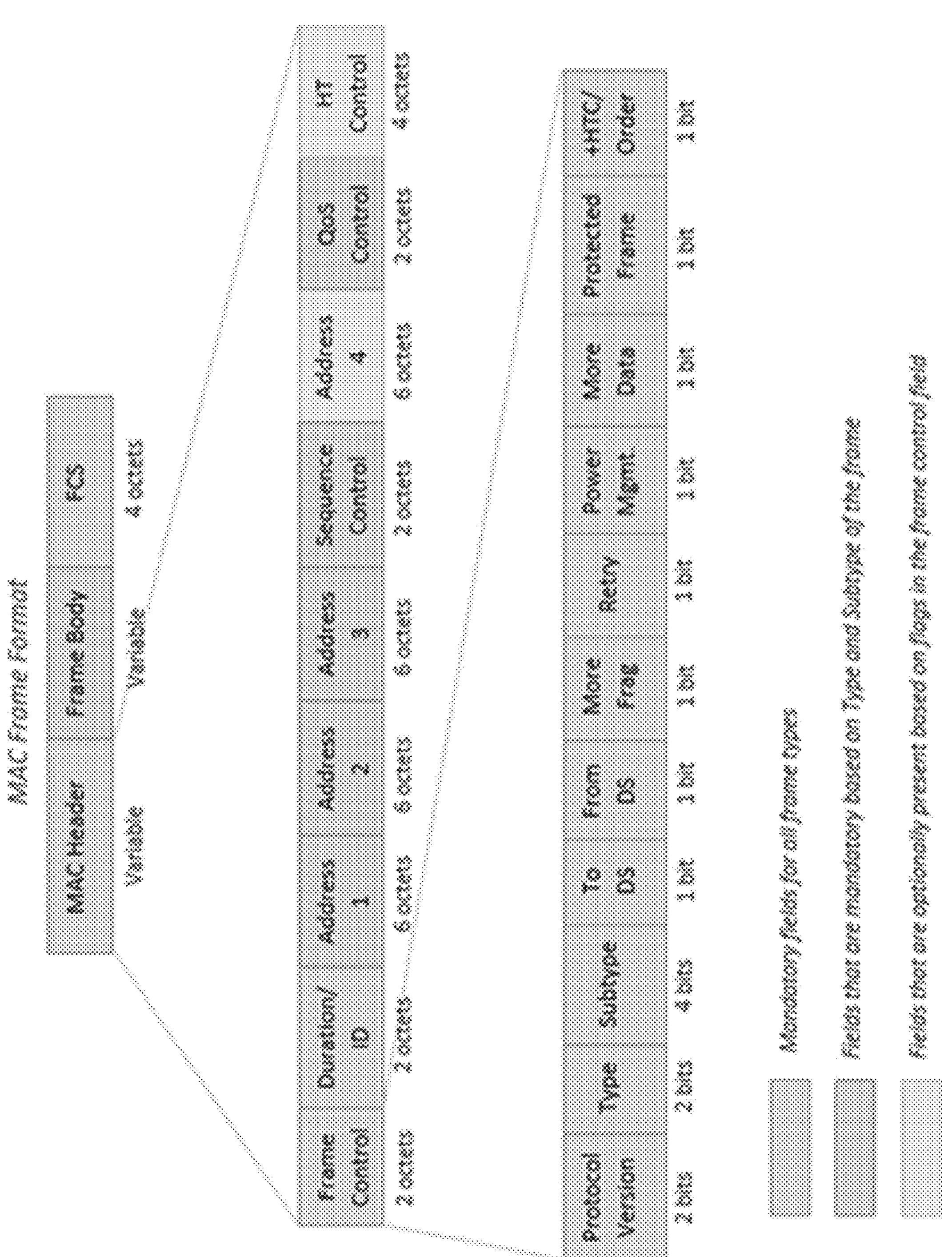

Reference is now made to FIG. 3A and FIG. 3B, which are schematic illustrations of exemplary data packet structures used to compute an identifier (ID) for each received data packet for correlating similar data packets, according to some embodiments of the present invention.

As seen in FIG. 3A, a Wi-Fi MAC frame for encapsulating data packets in frames as known in the art may consists of a header, a frame-body, and a frame check sequence (FCS). The header holds information about the frame, the frame-body carries data that needs to be transmitted and the FCS is computed over the header and frame-body. The combined binary content of one or more of the data fields defines by the header may be used to compute the ID for the respective data packet (frame) which may be sufficiently unique with respect to the other data packets at least during the predefined time period, since with significantly high probability, the value of this field(s) may not repeat (re-occur) in subsequent data packets. For example, the value of the "to Destination System (DS)" field, the value of the "From DS" filed, the value of the "Address 1|" field, and the value of the FCS field may be used to compute a sufficiently unique ID which may be temporally-unique at least during the predefined time period. One or more of the data fields, specifically such data fields which contribute to uniqueness of each data packet may be used, for example, by the receivers 104 to compute a unique ID for the respective data packet.

As seen in FIG. 3B, a Wi-Fi Duration/ID field as known in the art may be constructed of a duration value, an Association Identifier (AID) value and several reserved values. Since the duration value may be different for each transmitted data packet, at least during the predefined time period, the ID of each data packet which may be computed based on the duration value may be sufficiently unique for each data packet at least during the predefined time period, i.e., temporally-unique at least during the predefined time period. One or more of these data fields may be also used, for example, by the receivers 104 to compute a unique ID for the respective data packet.

Optionally, the receivers 104 may apply one or more arbitrary-length content mapping functions to compute the ID for each of the data packets, for example, a cryptographic hash function, a hash function, a CRC function and/or the like. This may be done to reduce the size of the ID computed for one or more of the data packets thus reducing the computing resources, for example, processing resources, storage resources and/or network resources required for transmitting, storing and/or processing the IDs of the data packets. The receivers 104 may compute the ID for each data packet by applying the arbitrary-length content mapping function(s) to the entire data packet, i.e., to all content of the respective data packet. However, the receivers 104 may compute the ID for each data packet by applying the arbitrary-length content mapping function(s) to only part of the data packet, for example, to one or more fields, data payload and/or the like. For example, the receivers 104 may compute the ID for each of the data packets by applying a hash function to compute a hash value based on at least part of the content of the respective data packet, for example, the data payload of the respective data packet, the data payload and the source address filed and/or the like. Moreover, the receivers 104 may utilize one or more hardware modules, for example, the AES encryption engine using a known encryption key to generate the hash value serving as the ID for one or more of the data packets. This may be of particular advantageous for modern CPUs comprising AES acceleration HW which may reduce computing time, computing resources and/or power consumption.

The reception event created by each receiver 104 for each received data packet to associate the respective data packet with its respective reception data may therefore comprise a respective ID computed for the received data packet, the reception data computed by the respective receiver 104 for the respective data packet and optionally the reception time of the respective data packet.

Figure 4A:
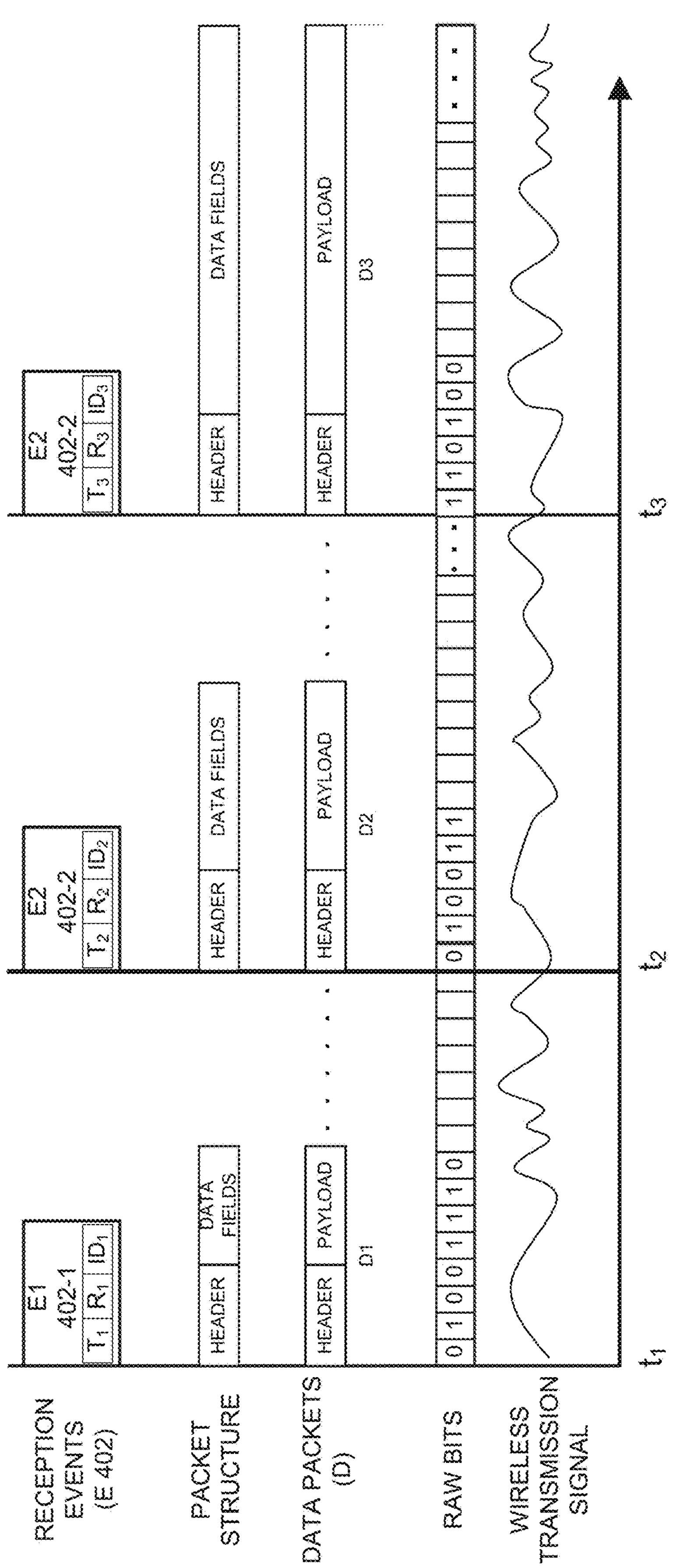
FIG. 4A, FIG. 4B and FIG. 4C are schematic illustrations of exemplary reception events sequences of data packets transmitted by wireless transmitters, according to some embodiments of the present invention.
Figures 4B, 4C:
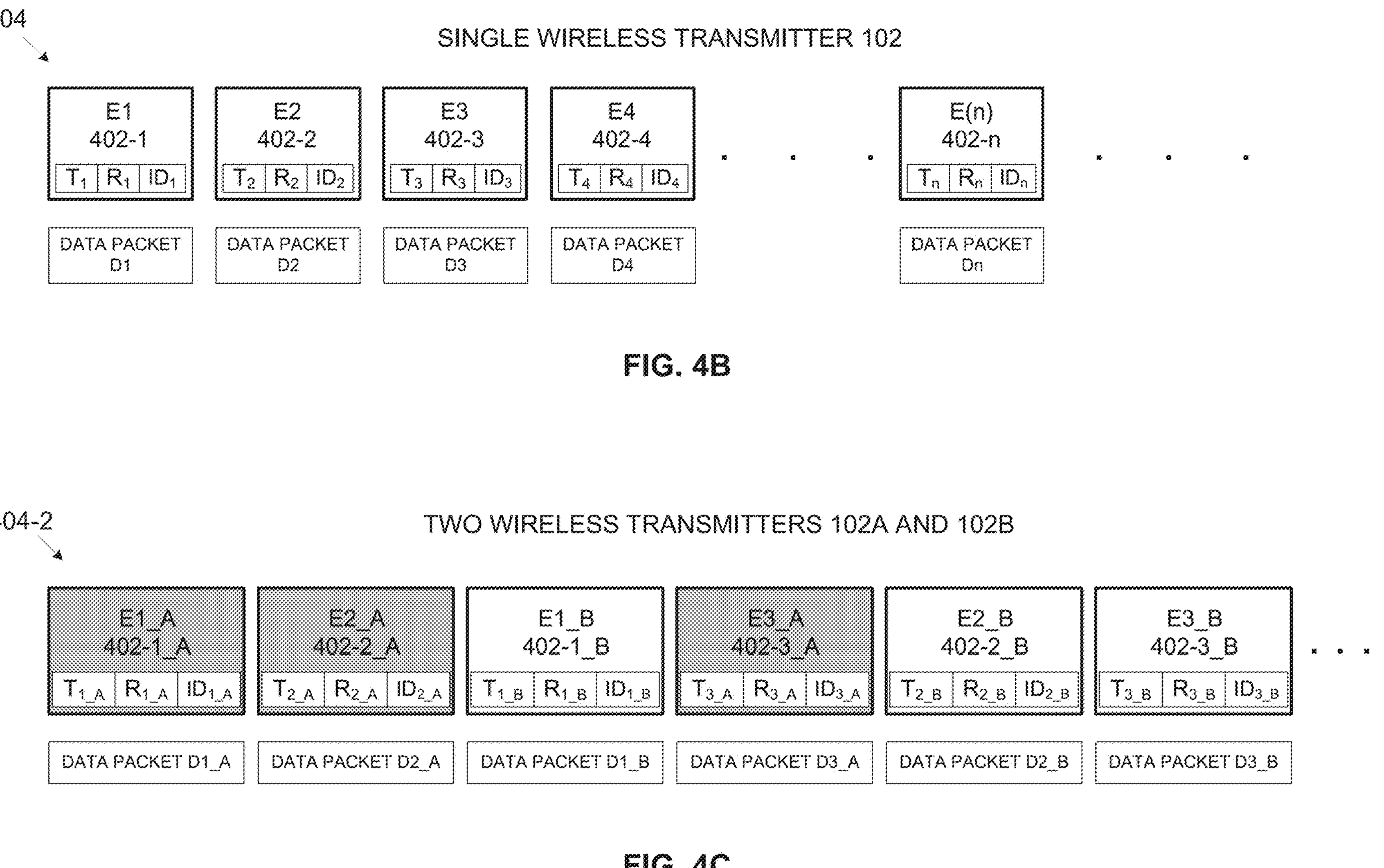

Reference is now made to FIG. 4A, FIG. 4B and FIG. 4C, which are schematic illustrations of exemplary reception events sequences of data packets transmitted by wireless transmitters, according to some embodiments of the present invention.

As seen in FIG. 4A, one or more data packets may be carried by a wireless transmission signal transmitted by a wireless transmitter such as the wireless transmitter 102. The data packets may be encoded according to the one or more protocols and/or encoding schemes such that each data packet may be represented as a raw bit stream (bit sequence). Moreover, each of the data packets may typically comprise one or more data fields as defined by the networking and/or communication protocol(s) applied by the wireless transmission 102 to transmit the data packets via the wireless transmission channel. For example, each data packet may comprise a header and a data payload. The header and/or the payload may further include one or more data fields, for example, a source address (originating node), a destination address (target node), a packet size, a packet type, information descriptive of the payload and/or the like. The payload which may comprise data may be optionally encrypted and in some cases the data payload of one or more of the data packets may be empty.

The reception of each data packet by each receiver such as the receiver 104 may be defined as a respective reception event E 402. For example, at t1 the receiver 104 may receive a first data packet D1 and may compute an identifier ID1 for the received data packet D1. The receiver 104 may generate a first reception event E1 402-1 associating the received data packet D1, specifically the identifier ID1 with respective reception data R1, for example RSSI. The receiver 104 may further assign a reception time (time stamp) T1 to the reception event E1 402-1 indicating a time of reception of the data packet D1, for example, t1. In another example, at t2 the receiver 104 may receive a second data packet D2 and may compute an identifier ID2 for the received data packet D2. The receiver 104 may generate a second reception event E2 402-2 associating the received data packet D2, specifically the identifier ID2 with respective reception data R2. The receiver 104 may further assign a reception time T2 to the reception event E2 402-2 indicating a time of reception of the data packet D2, for example, t2. In another example, at t3 the receiver 104 may receive a third data packet D3 and may compute an identifier ID3 for the received data packet D3. The receiver 104 may generate a third reception event E3 402-3 associating the received data packet D3, specifically the identifier ID3 with respective reception data R3. The receiver 104 may further assign a reception time (time stamp) T3 to the reception event E3 402-3 indicating a time of reception of the data packet D3, for example, t3 and so on.

As seen at FIG. 4B, an exemplary reception events sequence 404 generated by a receiver 104 for a plurality of received data packets transmitted by a wireless transmitter 102 may comprise a plurality of reception events 402, for example, a 1$^{st}$ reception event E1 402-1, a 2$^{nd}$ reception event E2 402-2, a 3$^{rd}$ reception event E3 402-3, a 4$^{th}$ reception event E4 402-4, through a n$^{th}$ reception event E(n) **402-*n*** and so on.

Each of the reception events E(i) associating each received data packet with its respective reception data may therefore include the identifier ID computed for the respective data packet D received by the receiver 104, respective reception data R computed by the receiver 104 for the respective data packet D and optionally a reception time T of the respective data packet D. For example, the reception event E1 402-1 may include an identifier ID1 computed for a data packet D1, the reception data R1 associated with the data packet D1 and the reception time T1 of the data packet D1, the reception event E2 402-2 may include an identifier ID2 computed for a data packet D2, the reception data R2 associated with the data packet D2 and the reception time T2 of the data packet D2, the reception event E3 402-3 may include an identifier ID3 computed for a data packet D3, the reception data R3 associated with the data packet D3 and the reception time T3 of the data packet D3, the reception event E4 402-4 may include an identifier ID4 computed for a data packet D4, the reception data R4 associated with the data packet D4 and the reception time T4 of the data packet D4, the reception event E(n) **402-*n*** may include an identifier IDn computed for a data packet Dn, the reception data Rn associated with the data packet Dn and the reception time Tn of the data packet Dn.

As seen at FIG. 4C, another exemplary reception events sequence 404-2 may be generated by a certain receiver 104 for a plurality of received data packets transmitted by a plurality of wireless transmitters 102, for example, two wireless transmitters 102A and 102B. The reception events sequence 404-2 may therefore comprise a plurality of reception events 402 corresponding to data packets originating from the wireless transmitter 102A and/or from the wireless transmitter 102B. For example, a 1$^{st}$ reception event E1_A 402-1_A, a 2$^{nd}$ reception event E2_A 402-2_A and a 3$^{rd}$ reception event E3_A 402-3_A may correspond to a 1$^{st}$ received data packet, a 2$^{nd}$ received data packet and a 3$^{rd}$ received data packet respectively which originate from the wireless transmitter 102A. Moreover, a 1$^{st}$ reception event E1_B 402-1_B, a 2$^{nd}$ reception event E2_B 402-2_B and a 3$^{rd}$ reception event E3_B 402-3_B may correspond to a 1$^{st}$ received data packet, a 2$^{nd}$ received data packet and a 3$^{rd}$ received data packet respectively originating from the wireless transmitter 102B.

As such the 1$^{st}$ reception event E1_A 402-1_A may include an identifier ID1_A computed for the respective 1$^{st}$ data packet D1_A, the reception data R1_A computed for the data packet D1_A and the reception time T1_A of the data packet D1_A at the certain receiver 104. The 2$^{nd}$ reception event E2_A 402-2_A may include an identifier ID2_A computed for the respective 2$^{nd}$ data packet D2_A, the reception data R2_A computed for the data packet D2_A and the reception time T2_A of the data packet D2_A at the certain receiver 104. The 3$^{rd}$ reception event E3_A 402-3_A may include an identifier ID3_A computed for the respective 3$^{rd}$ data packet D3_A, the reception data R3_A computed for the data packet D3_A and the reception time T3_A of the data packet D3_A at the certain receiver 104.

Similarly, the 1$^{st}$ reception event E2_B 402-1_B may include an identifier ID1_B computed for the 1$^{st}$ data packet D1_B and the reception data R1_B computed for the data packet D1_B and the reception time T1_B of the data packet D1_B at the certain receiver 104. The 2$^{nd}$ reception event E2_B 402-2_B may include an identifier ID2_B computed for the respective 2$^{nd}$ data packet D2_B, the reception data R2_B computed for the data packet D2_B and the reception time T2_B of the data packet D2_B at the certain receiver 104. The 3$^{rd}$ reception event E3_B 402-3_B may include an identifier ID3_B computed for the respective 3$^{rd}$ received data packet D3_B, the reception data R3_B computed for the data packet D3_B and the reception time T3_B of the data packet D3_B at the certain receiver 104.

Reference is made once again to FIG. 2.

As shown at 208, each of the receivers 104 may transmit the IDs computed for the received data packets to the synchronization system 100, specifically to the packet synchronizer 120. In particular, each receiver 104 may transmit to the packet synchronizer 120 each reception event generated for each data packet received from one of the wireless transmitters 102 which may comprise an ID computed for the respective data packet, the reception data computed for the respective data packet and optionally the reception time of the respective data packet. Since each receiver 104 may receive a plurality of data packets from the wireless transmitter(s) 102, the receiver 104 may in practice transmit to the packet synchronizer 120 an events sequence comprising a plurality of reception events.

As described herein before, the receivers 104 may communicate with the packet synchronizer 120 via one or more of the wired and/or wireless communication channels and/or networks deployed and/or established to connect between the receivers 104 and the synchronization system 100 via the I/O interface 110.

As shown at 212, the process 210 executed, for example, by the packet synchronizer 120 executed by the synchronization system 100, starts with the packet synchronizer 120 receiving the IDs computed for the data packets received by the receivers 104 from the wireless transmitter(s) 102. Each of the received data packets computed by the packet synchronizer 120 for a respective received data packet may be associated with the reception data computed by the respective receiver 104 for the respective received data packet.

In particular, the packet synchronizer 120 may receive from each of the receivers 104 a respective events sequence generated by the respective receiver 104 for data packets received by the respective receiver 104 from the wireless transmitter(s) 102. As described herein before, the reception events sequence generated by each receiver 104 may include a respective ID computed for a respective data packet, the reception data computed by the respective receiver 104 for the respective data packet and optionally the reception time of the respective data packet at the respective receiver 104.

Since the distinct receivers 104 may be unsynchronized with each other, the packet synchronizer 120 may receive asynchronously the plurality of reception events sequences from the plurality of different receivers 104.

As shown at 214, the packet synchronizer 120 may synchronize the received data packets, specifically the received reception events by correlating between similar data packets received by different receivers 104 based on the IDs computed for the data packets.

Similar data packets are data packets corresponding to same data packet(s) which are transmitted by the wireless transmitter 102 and received by at least some of the receivers 104. This means that a certain data packet transmitted by the wireless transmitter 102 which is received by multiple receivers 104 may yield a plurality of similar data packets each received by a respective one of the receivers 104. It should be noted that there may be a plurality of sets of similar data packets where each set corresponds to a respective one of a plurality of data packets transmitted by the wireless transmitter 102. For example, a first data packet transmitted by the wireless transmitter 102 may be received by a plurality of receivers 104 such that the received data packets form a first set of similar data packets corresponding to the first data packet. A second data packet transmitted by the wireless transmitter 102 may be also received by a plurality of receivers 104 such that the received data packets form a second set of similar data packets corresponding to the second data packet.

However, since the receivers 104 are unsynchronized with each other as well as unsynchronized with the synchronization system 100, the data packets received by the receivers 104 which correspond to the same data packet(s) transmitted by the wireless transmitter 102 may be received asynchronously by the packet synchronizer 120 from the receivers 104.

The packet synchronizer 120 may therefore use the IDs computed for the received data packets to correlate similar data packets corresponding to the same data packet(s) transmitted by the wireless transmitter 102 and thus synchronize together at least some of the similar data packets. Since the IDs are temporally-unique, at least during the predefined time period, the packet synchronizer 120 may successfully correlate together the similar data packets.

In particular, the packet synchronizer 120 may synchronize similar data packets by comparing their IDs and correlating between data packets having an equal ID value. Since each ID is computed based on the content of a respective data packet, data packets having the same content and hence the same ID may correspond to the same data packet transmitted by the wireless transmitter 102 and may be therefore correlated together.

Figure 5:
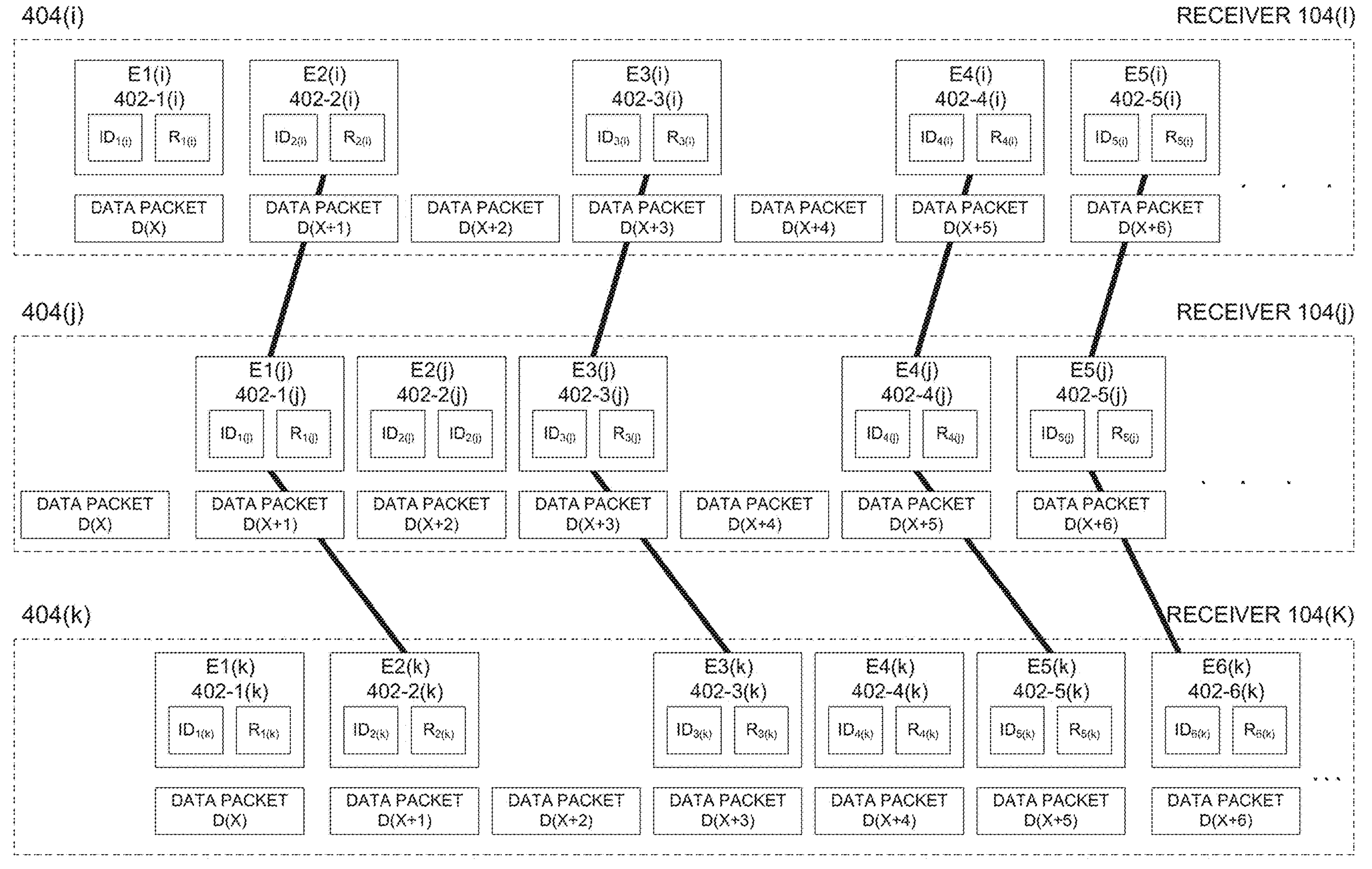
FIG. 5 is a schematic illustration of correlating exemplary event streams generated by multiple unsynchronized receivers for data packets transmitted by a wireless transmitter, according to some embodiments of the present invention.

Reference is now made to FIG. 5, which is a schematic illustration of correlating exemplary event streams generated by multiple unsynchronized receivers for data packets transmitted by a wireless transmitter, according to some embodiments of the present invention.

As seen, a packet synchronizer such as the packet synchronizer 120 may receive three event streams 404, in particular, an event stream 404(*i*) received from a receiver 104(*i*), an event stream 404(*j*) received from a receiver 104(*j*) and an event stream 404(*k*) received from a receiver 104(*k*). As described herein before, the event stream 404(*i*) may comprise a plurality of events Ex_(i) 402-*x*(*i*) (x=1, 2, 3, . . . ) corresponding to data packets received by the receiver 104(*i*), the event stream 404(*j*) may comprise a plurality of events Ex_(j) 402-*x*(*j*) corresponding to data packets received by the receiver 104(*j*) and the event stream 404(*k*) may comprise a plurality of events Ex_(k) 402-*x*(*k*) corresponding to data packets received by the receiver 104(*k*).

As seen, each of the event streams 404 includes only events corresponding to data packets which are actually received (intercepted) by the respective receiver 104. Therefore, in case a certain receiver 104 did not receive a certain data packet, the certain receiver 104 may not generate a respective reception event for the certain data packet and which may obviously not be transmitted to the packet synchronizer 120. For example, while seven data packets D(x) to D(x+6) may be transmitted by a wireless transmitter such as the wireless transmitter 102, the receiver 104(*i*) may receive only five of them, for example, data packets D(x), D(x+1), D(x+3), D(x+5) and D(x+6) while failing to receive data packets D(x+2) and D(x+4). In another example, the receiver 104(*j*) may also receive only five of the seven data packets, for example, data packets D(x+1), D(x+2), D(x+3), D(x+5) and D(x+6) while failing to receive data packets D(x) and D(x+4). In another example, the receiver 104(*k*) may receive six of the seven data packets, for example, data packets D(x). D(x+1), D(x+3), D(x+4), D(x+5) and D(x+6) while failing to receive data packets D(x+2).

The event stream 404(*i*) received from the receiver 104(*i*) may therefore include an event E1(*i*) 402-1(*i*) comprising an ID1(*i*) computed for data packet x and respective reception data R1(*i*), an event E2(*i*) 402-2(*i*) comprising an ID2(*i*) computed for data packet D(x+1) and respective reception data R2(*i*), an event E3(*i*) 402-3(*i*) comprising an ID3(*i*) computed for data packet D(x+3) and respective reception data R3(*i*), an event E4(*i*) 402-4(*i*) comprising an ID4(*i*)

computed for data packet D(x+5) and respective reception data R4($i$), an event E5($i$) 402-5($i$) comprising an ID5($i$) computed for data packet D(x+6) and respective reception data R5($i$) and so on.

The event stream 404($j$) received from the receiver 104($j$) may include an event E1($j$) 402-1($j$) comprising an ID1($j$) computed for data packet D(x+1) and respective reception data R1($j$), an event E2($j$) 402-2($j$) comprising an ID2($j$) computed for data packet D(x+2) and respective reception data R2($j$), an event E3($j$) 402-3($j$) comprising an ID3($j$) computed for data packet D(x+3) and respective reception data R3($j$), an event E4($j$) 402-4($j$) comprising an ID4($j$) computed for data packet D(x+5) and respective reception data R4($j$), an event E5($j$) 402-5($j$) comprising an ID5($j$) computed for data packet D(x+6) and respective reception data R5($j$) and so on.

The event stream 404($k$) received from the receiver 104($k$) may include an event E1($k$) 402-1($k$) comprising an ID1($k$) computed for data packet D(x) and respective reception data R1($k$), an event E2($k$) 402-2($k$) comprising an ID2($k$) computed for data packet D(x+1) and respective reception data R2($k$), an event E3($k$) 402-4($k$) comprising an ID3($k$) computed for data packet D(x+3) and respective reception data R3($k$), an event E4($k$) 402-4($k$) comprising an ID4($k$) computed for data packet D(x+4) and respective reception data R4($k$), an event E5($k$) 402-5($k$) comprising an ID5($k$) computed for data packet D(x+5) and respective reception data R5($k$), an event E6($k$) 402-6($k$) comprising an ID6($k$) computed for data packet D(x+6) and respective reception data R5($k$) and so on.

As evident the event streams 404($i$), 404($j$) and 404($k$) may be shifted in time with respect to each since the receivers 104($i$), 104($j$) and/or 104($k$) may be unsynchronized with each other. Moreover, each of the receivers 104($i$), 104($j$) and/or 104($k$) may fail to receive one or more of the data packets transmitted by the wireless transmitter 102.

However, despite the time shifts between the receivers 104 and potential missing data packets at one or more of the receivers 104, the packet synchronizer 120 may correlate between similar data packets based on their content, in particular based on the IDs of the data packets which are computed based on at least part of the content of the data packets.

For example, the packet synchronizer 120 may identify that ID2($i$) equals ID1($j$) and ID2($k$) since they are all computed for the same data packet D(x) and may therefore correlate the event E2($i$) 402-2($i$) with the events E1($j$) 402-1($j$) and E2($k$) 402-2($k$). In another example, the packet synchronizer 120 may identify that ID3($i$) equals ID3($j$) and ID3($k$) since they are all computed for the same data packet D(x+3) and may therefore correlate the event E3($i$) 402-3($i$) with the events E3($j$) 402-3($j$) and E3($k$) 402-3($k$). In another example, the packet synchronizer 120 may identify that ID4($i$) equals ID4($j$) and ID5($k$) since they are all computed for the same data packet D(x+5) and may correlate the event E4($i$) 402-4($i$) with the events E4($j$) 402-4($j$) and E5($k$) 402-5($k$). In another example, the packet synchronizer 120 may identify that ID5($i$) equals ID5($j$) and ID6($k$) since they are all computed for the same data packet D(x+6) and may correlate the event E5($i$) 402-5($i$) with the events E5($j$) 402-5($j$) and E6($k$) 402-6($k$).

While the packet synchronizer 120 may correlate similar packets received by all of the three receivers 104($i$), 104($j$) and 104($k$), the packet synchronizer 120 may optionally correlate between similar packets received by only two of the receivers 104($i$), 1904($j$) and 104($k$). For example, the data packet D(x) is received by the receivers 104($i$) and 104($k$) while the receiver 104($j$) failed to receive it. In such case the packet synchronizer 120 may identify that ID1($i$) equals ID1($k$) and may correlate the event E1($i$) 402-1($i$) with the event E1($k$) 402-1($k$).

As evident, since the receivers 104($i$), 104($j$) and 104($k$) fail to receive one or more of the data packets potentially different data packets, the events Ex(i), Ex(j) and Ex(k) may shift with respect to each other, for example, shift in their indexes. For example, since the receiver 104($i$) did not receive data packets D(x+2) and D(x+4) while the receiver 104($j$) failed to receive data packets D(x) and D(x+4) and the receiver 104($k$) failed to receive data packet D(x+2), the events Ex(i), Ex(j) and Ex(k) computed for the data packets received from receiver 104($i$), 104($j$) and 104($k$) respectively are shifted with respect to each other, for example, have shifted indexes.

However, since the correlation is done according to the IDs of the data packets computed based on the content of the data packets, the packet synchronizer 120 may easily recover from such missing and/or index shifted events and may continue to correlate following sets of similar data packets expressed by similar events. For example, as described herein before, the packet synchronizer 120 may identify that ID2($i$) equals ID1($j$) and ID2($k$) and may correlate the event E2($i$) 402-2($i$) with the events E1($j$) 402-1($j$) and E2($k$) 402-2($k$).

Reference is made once again to FIG. 2.

Optionally, the packet synchronizer 120 establishes a common time base among at least some of the plurality of receivers 104 based on the reception time of correlated data packets.

For example, as described herein before, each of the receivers 104 may assign a reception time to each reception event corresponding to reception of a certain data packet where the reception time indicates the time of reception of the respective data packet by the respective receiver 104. The packet synchronizer 120 may analyze the reception times assigned to correlated data packets, i.e., correlated reception events by the different receivers 104 and may establish the common time base according to the reception times of the different receivers 104.

The packet synchronizer 120 may apply one or more techniques and/or implementations to establish the common time base. For example, the packet synchronizer 120 may establish the common time base based on the timing information received in reception events from a selected one of the receivers 104. In another example, the packet synchronizer 120 may establish the common time base based on a local timing mechanism (e.g. clock) of the synchronization system 100.

After correlating similar reception events received from at least some of the receivers 104, the packet synchronizer 120 may compute a time shift between the reception time of the correlated reception events corresponding to similar data packets received by the at least some different receivers 104 and may identify accordingly the relative shift of each at least some different receivers 104 with respect to the common time base. For example, assuming the packet synchronizer 120 correlated between reception events received from a first, a second and a third receivers 104. Further assuming the correlated reception event received from the first receiver 104 was assigned by the first receiver 104 with a reception time shifted by a +1 clocks (cycles) compared to the common time base, the correlated reception event received from the second receiver 104 was assigned by the second receiver 104 with a reception time shifted by a +2 clock shift compared to the common time base and the correlated reception event received from the third receiver 104 was assigned by the third receiver 104 with a reception time shifted by a −1 clock shift compared to the common time base. In such case, the packet synchronizer 120 may determine that the clock of the first receiver 104 leads by 1 clock cycle the clock of the second receiver 104 and lags by 2 clock cycles the clock of the third receiver 104.

Moreover, when successfully correlating between reception events corresponding to similar data packets based on the ID computed based on the content of the similar data packets (step 216), the packet synchronizer 120 may update and/or adjust the common time base accordingly.

Optionally, after the common time base is established, the packet synchronizer 120 may correlate between reception events received from different receivers 104 according to (based on) the common time base. For example, assuming that according to the common time base, the packet synchronizer 120 determines that reception events received from the first receiver 104 precede data packets received from the second receiver 104 by 1 clock cycle. In such case, the packet synchronizer 120 may correlate between one or more reception events received from the first receiver 104 with respective reception events received from the second receiver 104 one clock cycle later.

Correlating reception events based on the common time base may significantly improve performance and/or accuracy of the content-based correlation. This is because the packet synchronizer 120 may need to analyze only a significantly small number of reception events received from the first and second receivers 104 which are temporally proximate to each other as derived based on the time difference between the two receivers 104, for example, the one clock time difference. Moreover, analyzing only the significantly small number of reception events received from the first and second receivers 104 which are determined by the packet synchronizer 120 to be temporally proximate based on the common time base and hence potentially correlated may significantly reduce the computing resources consumed by the packet synchronizer 120.

Furthermore, correlating reception events and hence data packets based on the common time base may be of particular benefit for similar data packets transmitted by the wireless transmitter 102 which have content that is insufficiently unique compared to the content of preceding and/or succeeding data packets transmitted by the wireless transmitter 102. As the content of these insufficiently unique subsequent data packets is significantly similar, and potentially identical, the IDs computed for these subsequent insufficiently unique data packets may be also identical and/or significantly identical. Since the subsequent data packets (events) may have identical IDs, the packet synchronizer 120 may be unable to distinguish between the consecutive reception events comprising the non-distinguishable IDs received from the receivers 104 and may therefore fail to correlate them based on the IDs (content). In such case, however, the packet synchronizer 120 may correlate between data packets received from different receivers 104 based on the common time base, specifically based on the relative shift of the clock associated with events received from each receiver 104 compared to the common time base.

According to some embodiments of the present invention the packet synchronizer 120 may further establish a common sampling time base for at least some of the plurality of receivers 104 based on the common time base. The common sampling time base may define a sampling time and optionally an order for sampling each of a plurality of wireless transmission channels used by one or more wireless transmitters 102 to transmit the plurality of data packets.

One or more of the receivers 104 may be configured to monitor and sample a plurality of wireless transmission channels. The plurality of wireless transmission channels may include, for example, multiple different channels, for example, multiple different networks (e.g. Wi-Fi, cellular, etc.) to which one or more of the wireless transmitter 102 are connected. In another example, the plurality of wireless transmission channels may include a plurality of sub-channels and/or frequency bands which constitute one or more multi-channel communication channels (links). Wi-Fi, for example, is one such exemplary multi-channel communication channel which is constructed of 16 sub-channels which may be used to transmit data between peers. Another example for a multi-channel communication channel is Frequency Division Multiple Access (FDMA) which comprises a plurality of frequency bands which may be allocated for use (communication) by one or more users.

Each of the receivers 104 configured to monitor multiple wireless transmission channels may therefore scan the plurality of wireless transmission channels, for example, periodically, cyclically, continuously and/or the like according to its local clock to sample, i.e., intercept and/or receive data packets transmitted via the sampled wireless transmission channels at the sampling time.

However, since the receivers 104 are unsynchronized with each other, obviously the receivers 104 may be also unsynchronized with respect to the sampling time of each of the plurality of transmission channels. Therefore, at the same point in time, at least some of the receivers 104 may monitor (scan) different wireless transmission channels which may lead to a situation that very few and potentially no data packets are received by multiple receivers 104 via the same wireless transmission channel. This lack of synchronization may of course significantly degrade efficiency, reliability and/or robustness of the data packets content-based correlation and synchronization done by the packet synchronizer 120 since very few similar data packets may be identified. This limitation may naturally depend on the number of different wireless transmission channels sampled by the receivers 104 and may increase with increase of the number of sampled channels.

In order to overcome the sampling synchronization limitation, the packet synchronizer 120 may establish the common sampling time base which may define a time for sampling each of the plurality of wireless transmission channels. In particular, the packet synchronizer 120 may establish the common sampling time base based on the common time based established for the plurality of receivers 104. The packet synchronizer 120 may then instruct one or more of the receivers 104 to sample the plurality of wireless transmission channels according to the common sampling time base, specifically according to a deviation of the respective receiver 104 from the common time base.

The sampling order of the plurality of wireless transmission channels may also be essential for properly synchronizing the sampling of the plurality of receivers 104. In some embodiments, the sampling order may be predefined and applied in the receivers 104. However, in some embodiments the packet synchronizer 120 may further instruct the receivers to sample the plurality of wireless transmission channels according to a common sampling order (scheme) which may be predefined and/or dynamically adjusted, adapted and/or altered.

Using the common sampling time base to instruct one or more of the receivers 104 to sample a certain wireless transmission channel at a certain sampling time, the packet synchronizer 120 may therefore coordinate and synchronize the sampling of the plurality of wireless transmission channels by at least some of the plurality of receivers 104. Synchronizing the receivers 104 to scan, monitor and receive data packets via the same wireless transmission channels may significantly increase the number of similar data packets received by multiple receivers 104 which in turn may significantly increase the efficiency, reliability and/or robustness of the of the packet synchronizer 120 in synchronizing and correlating similar data packets based on their content.

For example, assuming that based on the common sampling base, the packet synchronizer 120 identifies that the sampling time of a certain wireless transmission channel by a first receiver 104 precedes by two clock cycles the sampling time of the certain wireless transmission channel by a second receiver 104. In such case, the packet synchronizer 120 may establish the common sampling time base, for example, according to the clock of the first receiver 104 and may instruct the second receiver 104 to sample the certain wireless transmission channel at the same time the first receiver 104 samples the certain wireless transmission channel.

Moreover, after the common time base is established, the packet synchronizer 120 may synchronize between multiple receivers 104 according to (based on) the common time base. As described herein before, the receivers 104 may use respective local clocks which are unsynchronized with each other. Using the common time base, the packet synchronizer 120 may therefore synchronize at least some of the receivers 104. Specifically, rather than actually synchronizing the receivers 104 with each other, the packet synchronizer 120 may synchronize the data, i.e., the reception events received from the unsynchronized receivers 104, for example, reception data computed for one or more of the reception events indicating the reception time of the received data packets.

As shown at 216, the packet synchronizer 120 may output the correlated IDs coupled with their associated reception data and optionally their reception time to one or more apparatuses, for example, a processing unit, a device, a system, a server, a cloud based service and/or platform and/or the like configured to process the reception data associated with at least some of the correlated IDs for one or more applications.

In particular, the apparatus(s) may be configured to process jointly the reception data associated with at least some of the correlated IDs, meaning that multiple reception data sets associated with at least some of the correlated IDs may be processed, applied and/or used together for one or more of the applications.

The packet synchronizer 120 may output the output data, i.e., the correlated IDs and their associated reception data via one or more of the interfaces provided by the I/O interface 110. For example, the packet synchronizer 120 may transmit the output data to one or more remote apparatuses via one or more of the network interfaces of the I/O interface 110. In another example, the packet synchronizer 120 may transfer output data to one or more apparatuses connected to one or more of the interconnection ports of the I/O interface 110.

In some embodiments, the packet synchronizer 120 may execute the process 210 in real-time to correlate and synchronize data packets transmitted by the wireless transmitter 102 which are received by at least some of the receivers 104. However, according to some embodiments, the reception events received from the receivers 104 comprising the IDs of the received data packets associated with their respective reception data may be stored, for example, at the synchronization system 100, for example, in the storage 114. At any later time, the packet synchronizer 120 may restore, fetch, and/or retrieve the saved reception events and may correlate between reception events corresponding to similar packets based on their IDs offline, i.e., in retrospect.

According to some embodiments of the present invention, the apparatus receiving the reception data associated with the correlated IDs comprises an integration unit of a compound receiver comprising multiple receivers 104. The integration unit may be configured to aggregate the reception data associated with at least some of the correlated IDs which may be translated to correlated data packets in order to compute, produce and/or derive transformed reception data, for example, a direction from which the correlated data packets are received (AOA), i.e., the direction of the originating wireless transmitter 102 and/or the like.

Figure 6:
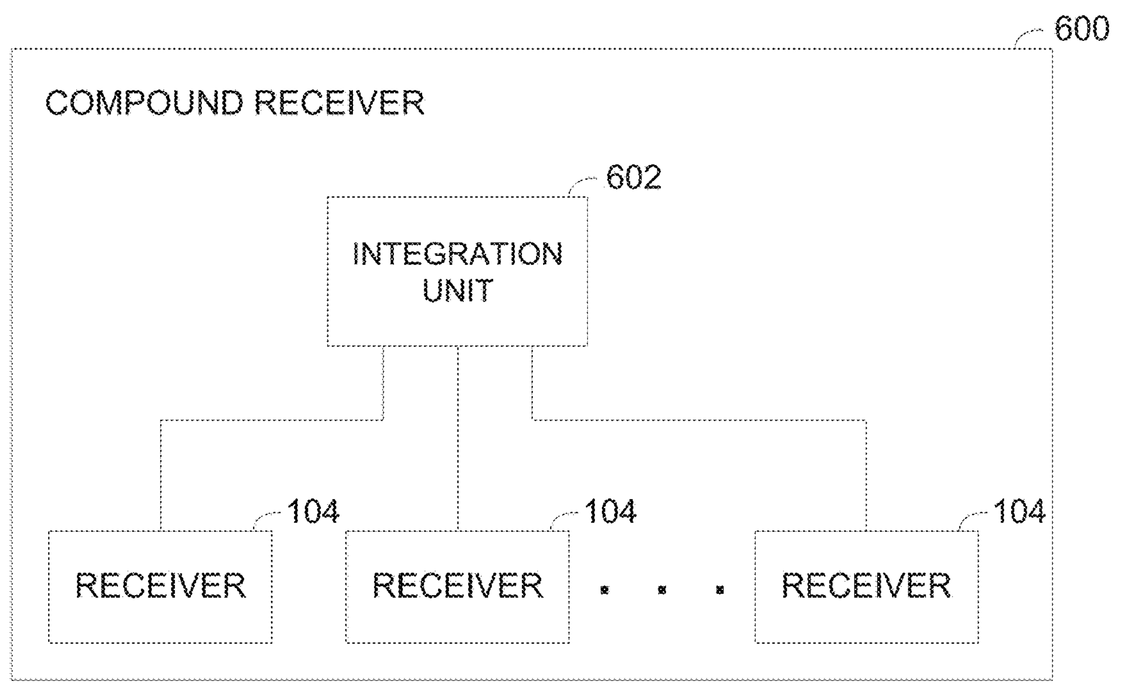
FIG. 6 is a schematic illustration of an exemplary compound receiver constructed of a plurality of unsynchronized receivers and an integration unit configured to correlate between similar data packets transmitted by a wireless transmitter which are received by at least some of the receivers, according to some embodiments of the present invention.
Figure 6:
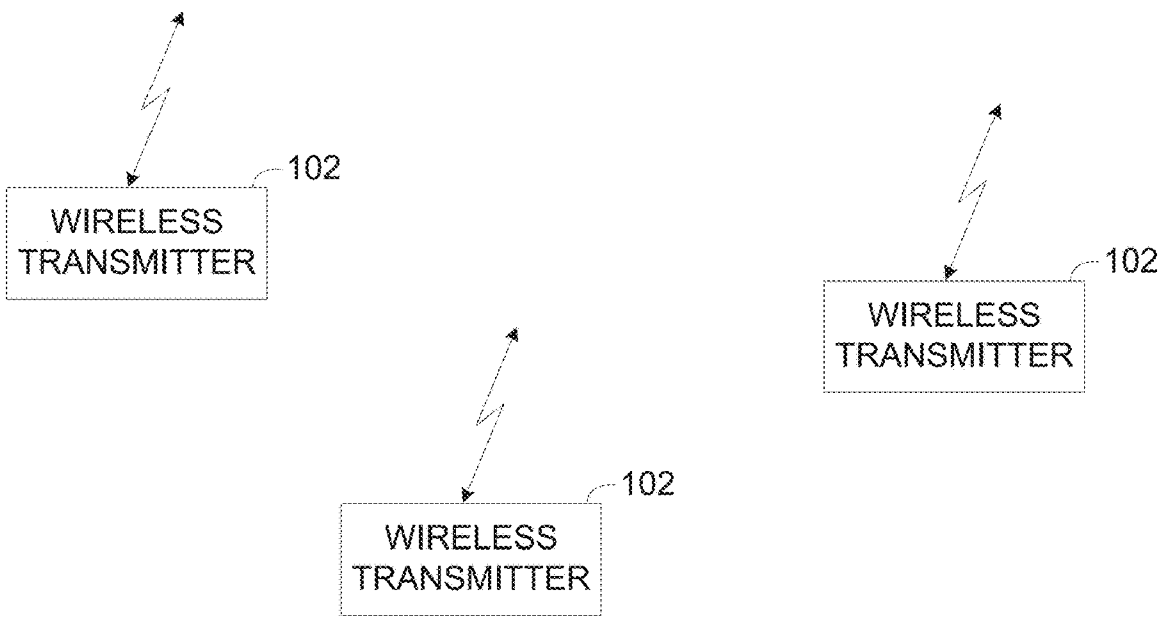

Reference is now made to FIG. 6, which is a schematic illustration of an exemplary compound receiver constructed of a plurality of unsynchronized receivers and an integration unit configured to correlate between similar data packets transmitted by a wireless transmitter which are received by at least some of the receivers, according to some embodiments of the present invention.

An exemplary compound receiver 600 may comprise a plurality of unsynchronized receivers such as the receivers 104 and an integration unit 602 configured to correlate between similar data packets transmitted by a wireless transmitter such as the wireless transmitter 102 which are received by at least some of the receivers 104.

The compound receiver 600 may be constructed using one or more architectures, constructions and/or deployments. For example, the compound receiver 600 may be constructed as a single package, a single rack, a box and/or the like physically comprising the plurality of receivers 104 and the integration unit 602. However, the compound receiver 600 may employ a distributed architecture where at least some of the receivers 104 and/or the integration unit 602 are distinct and mechanically disconnected. In another example, the integration unit 602 may be integrated, coupled and/or attached to one or more of the receivers 104.

The integration unit 602 may receive the correlated IDs and their associated reception data and optionally the associated reception time data from a synchronization system such as the synchronization system 100, in particular from a packet synchronizer such as the packet synchronizer 120 executed by the synchronization system 100.

Optionally, the compound receiver 600 and/or the integration unit 602 may integrate and/or include the synchronization system 100. Moreover, the integration unit 602 may facilitate the synchronization system 100 such that the integration unit 602 may directly communicate with the receivers 104 and may execute the packet synchronizer 120 to execute the process 210 for synchronizing and correlating similar data packets received by at least some of the receivers 104 based on the content of the received data packets.

The integration unit 602 may include one or more processors configured to execute one or more software modules and may further utilize one or more hardware modules available in the compound receiver 600. The integration unit 602 may therefore execute one or more functional modules utilized by one or more software modules, one or more of the hardware modules and/or a combination thereof. For example, the integration unit 602 may execute one or more functional module for aggregating the reception data associated with at least some of the correlated IDs in order to compute, produce and/or derive the transformed reception data, for example, the AOA, i.e. the direction of the originating wireless transmitter 102 and/or the like.

The compound receiver 600 may output the transformed reception data computed by the integration unit 602 optionally together with the associated correlated IDs to one or more apparatuses, devices, services and/or the like configured to use the transformed reception data for one or more applications. For example, the compound receiver 600 may provide (e.g. transmit) the transformed reception data to one or more locator systems configured to determine and/or compute the location of the wireless transmitter 102.

According to some embodiments of the present invention, the apparatus receiving the reception data associated with the correlated IDs comprises a locator system configured to determine and/or compute the location of the wireless transmitter 102 based on the reception data computed by the receivers 104 and associated with the at least some of the correlated IDs, specifically the correlated reception events.

Optionally, the locator system may integrate and/or include the synchronization system 100. Moreover, the locator system may facilitate the synchronization system 100 such that the locator system may communicate with the receivers 104 and may execute the packet synchronizer 120 to execute the process 210 for synchronizing and correlating similar data packets received by at least some of the receivers 104 based on the content of the received data packets. The locator system may further communicate with one or more compound receivers such as the compound receiver 600 to receive transformed reception data generated by the compound receiver(s) 600 based on reception data of correlated similar data packets, specifically correlated IDs of similar data packets received by multiple receivers 104 of the compound receiver(s) 600.

Each of the correlated reception events corresponding to similar data packets is received from a different one of the receivers 104 and may be therefore associated with respective reception data which depends on the location of the wireless transmitter 102 with respect to the respective receiver 104, for example, a respective RSSI, a respective AOA and/or the like.

The locator system may apply one or more methods, techniques and/or algorithms as known in the art to compute a location of the wireless transmitter 102 based on the reception data computed and received from the receivers 104. For example, the locator system may use one or more triangulation algorithms using the respective AOAs associated with the correlated reception events corresponding to similar data packets to compute the location of the wireless transmitter 102.

Optionally, the locator system may receive the transformed reception data from one or more compound receivers 600 and may be further configured to compute the location of the wireless transmitter 102 based on the transformed reception data, for example, the direction of the wireless transmitter 102 and/or the like as known in the art.

The location of the wireless transmitter 102 computed by the locator system may be a relative location and/or an absolute location.

In case the actual locations (geolocations) of the receivers 104 are unavailable to locator system, the locator system may be able to compute only a relative location of the wireless transmitter 102 with respect to the receivers 104, in particular, with respect to at least some of the receivers 104 which received the correlated reception events used to compute the location of the wireless transmitter 102. Such relative location computation may be highly efficient for computing a relative location between a plurality of distinct wireless transmitters 102. For example, a relative location may be computed between two wireless transmitters 102 coupled with two different vehicles. In another example, a relative location may be computed between two distinct wireless transmitters 102, one coupled with a vehicle and the other associated with a pedestrian. The locator system may first compute the relative location of each of the wireless transmitters 102 with respect to at least some of the receivers 104, specifically receivers 104 which received similar data packets and generated respective reception events which were successfully correlated together by the locator system. The locator system may then compute the relative location between the two wireless transmitters 102 based on their relative locations compared to the receivers 104.

In case the actual locations (geolocations) of the receivers 104 are available to locator system, the locator system may compute an absolute location of the wireless transmitter 102 based on the absolute location of at least some of the receivers 104 which received the correlated reception events corresponding to similar data packets.

According to some embodiments of the present invention, at least some of the receivers, in particular, receivers capable of computing AOA reception data used by the locator system to determine the location of the wireless transmitter 102 may be calibrated according to a known location of the wireless transmitter 102. Such receivers designated AOA capable receivers herein after may include, for example, the compound receivers 600. In another example, the AOA capable receivers may include one or more receivers 104 which comprise an antenna array and are thus capable, as known in the art, of computing the AOA for the data packets received from the wireless transmitter 102.

The location of the wireless transmitter 102 may be provided externally to the locator system and/or to one or more of the AOA capable receivers using one or more methods and/or techniques. For example, one or more GPS sensors may be coupled (e.g. integrated, mounted, attached, etc.) with the wireless transmitter 102 to report the location (position), specifically the geolocation of the wireless transmitter 102. The location of the wireless transmitter 102 which may be recorded by the wireless transmitter 102 itself and/or by one or more tracking systems configured to track the wireless transmitter 102 may be provided (e.g. transmitted) to the locator system and/or to one or more of the AOA capable receivers. In another example, the location, for example, map coordinates of a waypoint at which the wireless transmitter 102 is currently located and/or the like may be reported to the locator system and/or to one or more of the AOA capable receivers.

Based on the known location of the wireless transmitter 102 which may be referenced as “ground truth” coupled with reception data computed by the AOA capable receivers, the locator system and/or one or more of the AOA capable receivers may calibrate the receivers 104 with their ground truth location.

For example, assuming the locator system supported accordingly by the AOA capable receivers is configured to determine the location of the wireless transmitters 102 based on AOA. In such case, at least some of the AOA capable receivers, specifically those AOA capable receivers which are in range of the wireless transmitter 102 may receive the wireless signals transmitted by the wireless transmitter 102 while located in the known location. Each of the AOA capable receivers may then calibrate itself according to the respective AOA of the received wireless signals transmitted by the wireless transmitter 102 compared to the known location of the wireless transmitter 102.

Moreover, the location of the wireless transmitter 102 may be known in a plurality of locations thus providing a plurality of "ground truth" points. For example, the wireless transmitter 102 may travel between multiple known locations in which it is at least temporarily stationary. In another example, the locations of multiple wireless transmitters 102 may be known, specifically locations in which the wireless transmitters 102 are at least temporarily stationary. Using a plurality of known (ground truth) locations for calibrating the AOA capable receivers may significantly increase calibration accuracy.

Furthermore, calibration of the AOA capable receivers may be done using one or more existing services, systems, platforms and/or infrastructures. For example, the calibration may be done according to known locations of one or more vehicles of one or more managed fleets operated by operators. Such managed fleets may include, for example, one or more public transportation services comprising a plurality of vehicles such as, for example, busses, trains, trams, taxis and/or the like. In another example, managed fleets may include self-driven vehicles services, for example, a self-rented cars service, a self-rented scooters service, a self-rented bicycles service and/or the like.

Each of the vehicles of such managed fleets typically includes one or more GPS sensors thus facilitating the means for establishing the known location of the vehicle and one or more mobile data-network modules such as the wireless transmitter 102 for transmitting wireless signals which may be used for the calibration. Moreover, at least some of the vehicles of the managed fleets may be at least temporarily stationary for at least a predefined time period sufficient for gaining accurate enough location sufficient for the calibration, for example, parked, unused, stopped at a station, stopped at a gas station, stopped at a charging post and/or the like. While the vehicle is stationary, GPS coordinates may be accumulated and a mean may be computed for the accumulated GPS coordinates vehicle to increase accuracy of the known location of the vehicle to a few meters or even less. Furthermore, each of the fleet vehicles may be assigned a unique ID to identify the respective vehicle among the plurality of fleet vehicles.

The location of the fleet vehicles, in particular while stationary may be shared and/or provided to the AOA capable receivers, for example, transmitted via one or more networks, for example, the internet using one or more data sharing protocols as known in the art and/or any other predefined data protocol. Moreover, while it is possible that the fleet vehicles transmit their locations to the AOA capable receivers, in some deployments, the locations of the fleet vehicles may be provided to only a limited number of AOA capable receivers or optionally to a single AOA capable receivers which may distribute the known location of the vehicles, specifically while stationary to the other receivers 104.

One or more of the AOA capable receivers, specifically AOA capable receivers which are within transmission range of one or more stationary vehicles of the fleet may receive wireless signals transmitted from the respective stationary vehicle(s) and may calibrate based on the reception data computed for the received wireless signals compared to the known location of the respective stationary vehicle(s) identified by its ID. The AOA capable receivers may apply one or more of the calibration schemes described herein before, for example, based on AOA, and/or the like to calibrate with respect to a ground truth.

Optionally, the synchronization system 100 using the AOA capable receivers may contribute back to the managed fleet(s) operator(s) by sharing the determined locations of the fleet vehicles (as described in the process 210) to enable the operator(s) to more accurately track their vehicles. The synchronization system 100 may provide the managed fleet operator(s), for example, transmit the locations determined for one or more of the fleet vehicles continuously, periodically and/or on demand by the operator(s). This may enable an alternate tracking venue for the operator(s) to track their fleet vehicles which may serve to overcome imitations of the primary tracking scheme, for example, weak and/or distorted GPS signal which may significantly reduce accuracy, reliability and/or robustness of the GPS based location tracking. Moreover, the locations determined by the locator system for one or more of the fleet vehicles which are in motion (moving) may be significantly more accurate than the GPS tracking which is highly limited for moving objects since it is based on accumulating GPS coordinates and for moving objects it is thus based on only a few and typically a single GPS coordinates reading which may not be very accurate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms wireless transmission technologies, wireless transmission protocols and antenna array are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of synchronizing data packets received by distinct unsynchronized receivers from a wireless transmitter, comprising:

using at least one processor of a synchronization unit for:

receiving asynchronously, from a plurality of distinct unsynchronized receivers, a plurality of identifiers (ID), each ID computed by a respective one of the plurality of distinct unsynchronized receivers for a respective one of a plurality of data packets transmitted by at least one wireless transmitter via at least one wireless transmission channel and received by the respective receiver, each of the plurality of IDs is associated with respective reception data computed by the respective receiver of the plurality of receivers for the respective data packet;

correlating, by the synchronization unit and based on the IDs received from the plurality of distinct unsynchronized receivers, between similar data packets received by at least some of the plurality of receivers, wherein the similar data packets correspond to a same data packet transmitted by the at least one wireless transmitter and received by at least two of the plurality of distinct unsynchronized receivers; and outputting the correlated IDs coupled with their associated reception data to at least one apparatus configured to process jointly the reception data associated with at least some of the correlated IDs.

2. The method of claim 1, wherein the similar correlated data packets correspond to at least one data packet transmitted by the at least one wireless transmitter which is received by the at least some receivers.

3. The method of claim 1, wherein the reception data associated with each received data packet comprising at least a Received Signal Strength Indicator (RSSI) of the respective received data packet.

4. The method of claim 1, wherein each of the receivers is further configured to associate each received data packet with a respective time of arrival (TOA) of the respective data packet.

5. The method of claim 1, wherein the ID of at least some of the plurality of data packets is temporally-unique with respect to preceding and/or succeeding data packets transmitted by the at least one wireless transmitter at least during a predefined time period.

6. The method of claim 1, wherein the ID of each of the plurality of data packets is computed based on at least part of the respective data packet.

7. The method of claim 6, wherein the at least part of the respective data packet comprises at least one field of the respective data packet defined by at least one communication protocol used to transmit the respective data packet via the at least one wireless transmission channel.

8. The method of claim 7, wherein the ID of the data packets is further computed based on at least one network parameter of the at least one wireless transmission channel.

9. The method of claim 7, wherein the ID of the data packets is further computed based on a device ID of the at least one wireless transmitter extracted from at least one of the plurality of data packets to associate between the at least one data packet and the at least one wireless transmitter.

10. The method of claim 1, wherein the ID of at least some of the plurality of data packets is computed using at least one arbitrary-length content mapping function applied to at least part of the respective data packet, the at least one arbitrary-length content mapping function is a member of a group consisting of: a hash function, a cryptographic hash function and a CRC function.

11. The method of claim 1, further comprising establishing a common time base among the plurality of receivers based on a reception time of the at least some correlated data packets.

12. The method of claim 11, wherein at least some of the plurality of data packets are correlated based on the common time base.

13. The method of claim 11, wherein at least some of the plurality of receivers are synchronized based on the common time base.

14. The method of claim 11, further comprising establishing a common sampling time base for at least some of the plurality of receivers based on the common time base, the common sampling time base defines a sampling time for each of a plurality of wireless transmission channels used by the at least one wireless transmitter to transmit the plurality of data packets.

15. The method of claim 1, wherein the at least one apparatus comprises an integration unit of a compound receiver comprising the plurality of receivers, the integration unit is configured to aggregate the reception data associated with the correlated IDs to produce transformed reception data.

16. The method of claim 1, wherein the at least one apparatus comprises a locator system configured to compute a location of the at least one wireless transmitter with respect to the at least some receivers based on the reception data associated with the correlated IDs.

17. The method of claim 16, wherein the location computed for the at least one wireless transmitter is a relative location with respect to the at least some receivers.

18. The method of claim 16, wherein the location computed for the at least one wireless transmitter is an absolute location computed based on predefined locations of the at least some receivers.

19. The method of claim 16, further comprising calibrating at least one of the plurality of receivers according to a known location of the wireless transmitter.

20. The method of claim 1, wherein each of the plurality of distinct unsynchronized receivers computes the respective ID for the respective data packet by applying a same content mapping function to at least part of a content of the respective data packet independently of the other receivers of the plurality of distinct unsynchronized receivers.

21. The method of claim 1, wherein each of the plurality of distinct unsynchronized receivers transmits to the synchronization unit a reception event for each received data packet, the reception event comprising the respective ID, the respective reception data, and a reception time of the respective data packet computed according to a local clock of the respective receiver.

22. The method of claim 1, wherein at least one of the plurality of distinct unsynchronized receivers fails to receive one or more data packets of the plurality of data packets transmitted by the at least one wireless transmitter, and the synchronization unit correlates the similar data packets based on matching IDs despite different ones of the plurality of distinct unsynchronized receivers failing to receive different data packets.

23. A system for synchronizing data packets received by distinct unsynchronized receivers from a wireless transmitter, comprising:

at least one processor of a synchronization unit configured to execute a code, the code comprising:

code instructions to receive asynchronously, from a plurality of distinct unsynchronized receivers, a plurality of identifiers (ID), each ID computed by a respective one of the plurality of distinct unsynchronized receivers for a respective one of a plurality of data packets transmitted by at least one wireless transmitter via at least one wireless transmission channel and received by the respective receiver, each of the plurality of IDs is associated with respective reception data computed by the respective receiver of the plurality of receivers for the respective data packet;

code instructions to correlate, by the synchronization unit and based on the IDs received from the plurality of distinct unsynchronized receivers, between similar data packets received by at least some of the plurality of receivers, wherein the similar data packets correspond to a same data packet transmitted by the at least one wireless transmitter and received by at least two of the plurality of distinct unsynchronized receivers; and code instructions to output the correlated IDs coupled with their associated reception data to at least one apparatus configured to process jointly the reception data associated with at least some of the correlated IDs.

* * * * *